United States Patent [19]

Elsen et al.

[11] Patent Number: 5,422,131
[45] Date of Patent: Jun. 6, 1995

[54] NONDIGESTIBLE FAT COMPOSITIONS CONTAINING RELATIVELY SMALL NONDIGESTIBLE SOLID PARTICLES FOR PASSIVE OIL LOSS CONTROL

[75] Inventors: Joseph J. Elsen, Cincinnati; Jeffrey J. Kester, West Chester; Peter Y. T. Lin, Middletown; Thomas J. Wehmeier, Cincinnati, all of Ohio

[73] Assignee: The Procter & Gamble Company, Cincinnati, Ohio

[21] Appl. No.: 969,670

[22] Filed: Oct. 30, 1992

[51] Int. Cl.⁶ .................................................. A23L 1/00
[52] U.S. Cl. ...................................... 426/531; 426/601; 426/611; 426/804; 536/119; 554/227
[58] Field of Search .............. 426/438, 531, 549, 601, 426/606, 607, 609, 610, 611, 612, 804; 536/119; 554/161, 227

[56] References Cited

U.S. PATENT DOCUMENTS

| | | | |
|---|---|---|---|
| 2,097,720 | 11/1937 | Clayton et al. | 260/398.5 |
| 2,266,591 | 12/1941 | Eckey et al. | 99/163 |
| 2,962,419 | 11/1960 | Minich | 167/81 |
| 3,059,009 | 10/1962 | Schmid et al. | 260/428 |
| 3,059,010 | 10/1962 | Schmid et al. | 260/428 |
| 3,093,481 | 6/1963 | Eckey et al. | 99/118 |
| 3,158,490 | 11/1964 | Baur et al. | 99/118 |
| 3,353,966 | 11/1967 | Hugenberg et al. | 99/163 |
| 3,353,967 | 11/1967 | Lutton | 99/163 |
| 3,360,376 | 12/1967 | Dobson | 99/118 |
| 3,367,782 | 2/1968 | Lutton et al. | 99/118 |
| 3,397,997 | 8/1968 | Japikse | 99/118 |
| 3,443,966 | 5/1969 | Reid | 99/118 |
| 3,495,010 | 2/1970 | Fossel | 424/312 |
| 3,495,011 | 2/1970 | Fossel | 424/312 |
| 3,600,186 | 8/1971 | Mattson et al. | 99/1 |
| 3,637,774 | 1/1972 | Babayan et al. | 260/410.6 |
| 3,649,647 | 3/1972 | Ota | 260/345.8 |
| 4,005,195 | 1/1977 | Jandacek | 424/180 |
| 4,005,196 | 1/1977 | Jandacek et al. | 424/180 |
| 4,363,763 | 12/1982 | Peterson | 260/410.7 |
| 4,368,213 | 1/1983 | Hollenbach et al. | 426/590 |
| 4,469,635 | 9/1984 | Peterson | 260/403 |
| 4,582,715 | 4/1986 | Volpenhein | 426/601 |
| 4,797,300 | 1/1989 | Jandacek et al. | 426/549 |
| 4,830,787 | 5/1989 | Klemann | 260/410 |
| 4,919,964 | 4/1990 | Adams et al. | 426/564 |
| 4,959,465 | 9/1990 | Klemann | 536/115 |
| 4,960,602 | 10/1990 | Talkington et al. | 426/534 |
| 4,962,092 | 10/1990 | Wood | 514/23 |
| 4,963,386 | 10/1990 | Klemann | 426/611 |
| 4,980,191 | 12/1990 | Christensen | 426/601 |
| 5,017,398 | 5/1991 | Jandacek et al. | 426/603 |
| 5,085,884 | 2/1992 | Young et al. | 426/611 |
| 5,102,683 | 4/1992 | Letton et al. | 426/601 |
| 5,137,743 | 8/1992 | Zaks et al. | 426/602 |
| 5,158,796 | 10/1992 | Bernhardt et al. | 426/549 |
| 5,194,270 | 3/1993 | Cante et al. | 426/74 |
| 5,219,604 | 6/1993 | Klemann et al. | 426/531 |
| 5,225,049 | 7/1993 | Barmentlo et al. | 203/34 |
| 5,230,913 | 7/1993 | Klemann | 426/97 |
| 5,236,733 | 8/1993 | Zimmerman et al. | 426/611 |

FOREIGN PATENT DOCUMENTS

| | | | |
|---|---|---|---|
| 233856 | 8/1987 | European Pat. Off. | A23D 5/00 |
| 236288 | 9/1987 | European Pat. Off. | A23D 5/00 |
| 311154 | 4/1989 | European Pat. Off. | C07H 13/06 |
| 0325463 | 7/1989 | European Pat. Off. | C07C 69/675 |
| 350987 | 1/1990 | European Pat. Off. | A23D 09/00 |
| 375027 | 6/1990 | European Pat. Off. | A23D 09/00 |
| 390410 | 10/1990 | European Pat. Off. | A23D 09/00 |
| 420314 | 4/1991 | European Pat. Off. | A23D 07/00 |

(List continued on next page.)

Primary Examiner—Leslie A. Wong
Attorney, Agent, or Firm—Tara M. Rosnell; G. W. Allen; Rose Ann Dabek

[57] ABSTRACT

Nondigestible fats having relatively flat Solid Fat Content (SFC) profile slopes between typical room and body temperatures are disclosed. These nondigestible fats contain a liquid nondigestible oil and relatively small nondigestible particles dispersed in the oil to control passive oil loss. Edible fat-containing products containing these nondigestible fats can be less waxy tasting due to the lower level of solids required for passive oil loss control.

21 Claims, 10 Drawing Sheets

FOREIGN PATENT DOCUMENTS

| | | | |
|---|---|---|---|
| 424066 | 4/1991 | European Pat. Off. | C07H 13/06 |
| 434117 | 6/1991 | European Pat. Off. | C07H 13/06 |
| 434119 | 6/1991 | European Pat. Off. | C07H 13/06 |
| 207070 | 2/1984 | Germany | A23I 01/30 |
| 227137 | 9/1985 | Germany | |
| 49-26220 | 3/1974 | Japan | |
| 52-27694 | 7/1977 | Japan | |
| 58-78531 | 5/1983 | Japan | A21D 02/16 |
| 9062511A | 4/1984 | Japan | |
| 59-143550 | 8/1984 | Japan | |
| 59-156242 | 9/1984 | Japan | |
| 2020247A | 1/1990 | Japan | |
| 2-262538 | 10/1990 | Japan | C07C 69/732 |
| 3-81042 | 8/1992 | Japan | A23D 9/00 |
| 04237458A | 8/1992 | Japan | A23D 9/00 |
| WO91/10368 | 7/1991 | WIPO | A23D 7/00 |
| WO91/15960 | 10/1991 | WIPO | A23D 7/00 |
| WO91/15961 | 10/1991 | WIPO | A23D 7/00 |
| WO91/15962 | 10/1991 | WIPO | A23D 9/00 |
| WO91/15963 | 10/1991 | WIPO | A23D 9/00 |
| 92/03937 | 3/1992 | WIPO | A23L 1/308 |
| WO92/04360 | 3/1992 | WIPO | C07H 13/06 |
| 92/17077 | 10/1992 | WIPO | A23L 1/308 |

NONDIGESTIBLE FAT COMPOSITIONS CONTAINING RELATIVELY SMALL NONDIGESTIBLE SOLID PARTICLES FOR PASSIVE OIL LOSS CONTROL

TECHNICAL FIELD

The present invention relates to nondigestible fat compositions that are useful as full or partial replacers for triglyceride fats or oils in foods. More particularly, the present invention provides such nondigestible fat compositions that provide passive oil loss control without being excessively waxy tasting.

BACKGROUND OF THE INVENTION

Certain polyol fatty acid polyesters have been suggested as low or reduced calorie substitutes for triglyceride fats and oils used in foods. For example, nonabsorbable, nondigestible sugar fatty acid esters or sugar alcohol fatty acid esters having at least 4 fatty acid ester groups with each fatty acid having from 8 to 22 carbon atoms have been used as partial or full fat replacers in low calorie food compositions. (See Mattson & Volpenhein; U.S. Pat. No. 3,600,186; Issued Aug. 17, 1971.) Foods in which these polyol polyesters are particularly useful as partial or complete replacements for triglyceride fats or oils include products suitable for use in frying. Unfortunately, regular ingestion of moderate to high levels of completely liquid forms of these polyol polyesters can produce undesirable passive oil loss, namely, leakage of the polyesters through the anal sphincter. By contrast, completely solid versions of these polyesters provide a sufficiently high solids content at mouth temperatures (e.g., 92° F., 33.3° C.) such that they give a waxy taste or impression in the mouth when ingested.

As an alternative to these completely liquid or completely solid nondigestible/nonabsorbable polyol polyesters, certain intermediate melting polyol fatty acid polyesters have been developed that provide passive oil loss control, while at the same time reducing waxiness in the mouth. (See Bernhardt; European Patent Application Nos. 236,288 and 233,856; Published Sep. 9, and Aug. 26, 1987, respectively.) These intermediate melting polyol polyesters exhibit a unique theology at body temperature by virtue of their having a matrix which involves a minimal level of solids (e.g. about 12% or lower) that bind the remaining liquid portion. As a result, these intermediate melting polyol polyesters are sufficiently viscous and have a sufficiently high liquid/solid stability at body temperature to provide passive oil loss control. An example of such intermediate melting polyol polyesters are those obtained by substantially completely esterifying sucrose with a 55:45 mixture of fully hydrogenated (hardstock) and partially hydrogenated soybean oil fatty acid methyl esters. (See Examples 1 and 2 of the above European patent applications.)

These intermediate melting polyol polyesters can be used as total or partial replacements for other fats and oils in various food products, including cooking and frying oils. However, it has been found that certain foods such as potato chips fried in frying fats containing substantial levels of these nondigestible intermediate melting polyol polyesters, particularly at levels in excess of about 40%, can give a significantly increased waxiness impression compared to potato chips that have been fried in the digestible triglyceride fat or oil that the nondigestible polyol polyester has partially replaced. (In terms of physical properties, "waxiness" relates to how the fat composition is sensed in the mouth, and specifically relates in part to the sensation of the product having a relatively high level of solids.) Indeed, this increased waxiness impression with regard to these intermediate melting polyol polyesters is recognized in the aforementioned European Patent Application No. 233,856 inasmuch as that application discloses fat compositions which contain digestible food materials, such as triglycerides and substituted mono- and diglycerides, that act as solvents for the intermediate melting polyol polyesters. However, as the proportion of triglycerides is increased relative to the intermediate melting polyol polyesters so as to impart less waxiness, the caloric content of the frying fat also increases accordingly. In addition, it has been found that frying fats containing greater than about 40% of these intermediate melting polyol polyesters can adversely affect the flavor display of the resulting fried food, in particular potato chips.

The waxiness impression imparted by intermediate melting polyol polyesters such as those of the aforementioned European '288 and '856 applications is believed to be due at least in part to their change in Solid Fat Content (SFC), particularly between typical room temperature (i.e. 70° F., 21.1° C.) and body temperature (i.e. 98.6°, 37° C.). For example, the intermediate melting sucrose polyester of Example 2 of European Patent Application Nos. 233,856 and 236,128 has an SFC profile slope (as hereinafter defined) between room temperature and body temperature of about $-1.3$. In other words, the SFC profile slope of these intermediate melting polyol polyesters is relatively steep. Given this relatively steep SFC profile slope, the change in solids content of these intermediate melting polyol polyesters can be sufficiently great such that a high level of solids will be sensed when such room temperature materials are first placed in the mouth, thereby leading to an increased waxiness sensation.

Blends of completely liquid polyol polyesters with completely solid polyol polyester hardstocks, preferably esterified with $C_{10}$-$C_{22}$ saturated fatty acids (e.g. sucrose octastearate), have also been proposed in order to provide passive oil loss control. (See, for example, Jandacek; U.S. Pat. No. 4,005,195; and Jandacek/Mattson; U.S. Pat. No. 4,005,196; Both issued Jan. 25, 1977.) Blends of these liquid polyol polyesters and solid polyol polyesters hardstocks have relatively flat SFC profile slopes between typical room temperature and body temperature, i.e. slopes of from 0 to about $-0.3$, and more typically from 0 to about $-0.1$. In other words, there is little or no change in the solids content of these blends between room temperature and body temperature.

Although providing at least temporary passive oil loss control, blends of liquid polyol polyesters and solid polyol polyester hardstocks according to the aforementioned U.S. '195 and '196 patents do not necessarily provide passive oil loss control over an extended period of time. It has been found that these solid polyol polyester hardstocks normally tend to form large spherulitic particles (typically from about 3 to about 32 microns in size) in the liquid polyol polyesters. These large spherulitic particles may tend to phase separate from the liquid polyol polyesters during storage of such blends. As a result, a two-phase system can develop with the liquid portion thereof providing minimal or no passive oil loss control.

In addition, blends of liquid polyol polyesters and solid polyol polyester hardstocks according to the aforementioned U.S. Pat. Nos. 4,005,195 and 4,005,196 do not necessarily lead to less waxy tasting products. As taught in these patents, a relatively high level of solid polyol polyester hardstock is required to provide passive oil loss control. For example, hardstock is preferably used in an amount of from about 20% to about 50% by weight of the liquid polyol polyester. (See Column 9, lines 65–68, of U.S. Pat. No. 4,005,195.) Such a level of solid polyol polyester hardstock used for passive oil loss control at body temperature can lead to a waxy tasting product due to the relatively high level of solids that will also be present at mouth temperature.

In view of the foregoing, it would be desirable to provide nondigestible fat compositions comprising blends of liquid polyol polyesters and solid polyol polyester hardstock particles with such blends exhibiting little or no phase separation of the hardstock particles from the liquid polyol polyesters. In addition, it would be desirable to be able to reduce the level of solid polyol polyester hardstock required for effective passive oil loss control so as to provide less waxy tasting products.

SUMMARY OF THE INVENTION

The present invention relates to nondigestible fat compositions which are useful as replacements for triglyceride fats and oils in food products. Such compositions have a Solids Fat Content (SFC) profile slope between room temperature (70° F.) and body temperature (98.6° F.) of from 0 to about −0.75% solids/°F. Such compositions further comprise a liquid nondigestible oil component having dispersed therein nondigestible solid polyol polyester particles in an amount sufficient to control passive oil loss upon ingestion of the nondigestible fat compositions.

The liquid nondigestible oil component of the compositions herein is one which has a complete melting point below about 37° C. The polyol polyesters which can be used to form the nondigestible solid particles used as oil loss control agents in the compositions herein are those which have a complete melting point above about 37° C. but below about 500° C. Said solid particles furthermore cannot consist solely of polyol polyesters wherein the polyol component thereof has at least 4 hydroxyl groups, at least 4 of which are esterified, and wherein the ester groups of the polyol polyesters are comprised of a combination of certain "short chain" fatty acid radicals and certain "long chain" fatty acid radicals in a short chain to long chain molar ratio of from about 1:15 to about 2:1, with a minimum long chain content of at least 15% by weight. For purposes of this proviso, "short chain" fatty acid radicals are defined as a) $C_{12}$ or higher unsaturated fatty acid radicals, b) $C_2$–$C_{12}$ saturated fatty acid radicals, or c) mixtures of such unsaturated and saturated radicals. Furthermore, "long chain" fatty acid radicals, for purposes of this proviso, are defined as $C_{20}$ or higher saturated fatty acid radicals.

The nondigestible solid particles dispersed in the liquid nondigestible oil component of the compositions herein can be further characterized as those which have a thickness (i.e., minimum dimension) of about one micron or less. Alternatively, the nondigestible solid particles used in the fat compositions herein can be characterized as those which impart to the fat composition an Oil Separation Value (as hereinafter defined) of about 16 grams or less or those which impart to the fat compositions a Thixotropic Area Value (also as hereinafter defined) of at least about 10 kPa/sec.

The nondigestible fat compositions of the present invention provide significant advantages over known intermediate melting polyol polyesters, as well as prior art blends of liquid polyol polyesters and solid polyol polyester hardstocks. The relatively small nondigestible particles provide especially efficient passive oil loss control. As a result, the level of solids at body temperature required for passive oil loss control can be reduced to relatively low levels, (e.g. less than about 20%, more preferably less than about 15% of the nondigestible fat). In addition, the nondigestible fats of the present invention have relatively flat SFC profile slopes, thus leading to minimal or no change in solids content between typical room temperature and body temperature. This combination of the relatively low solids levels required for passive oil loss control, with minimal/no solids content change between room and body temperatures, can result in less waxy tasting products containing these nondigestible fats.

DETAILED DESCRIPTION OF THE INVENTION

A) Definitions

Figure 1C:
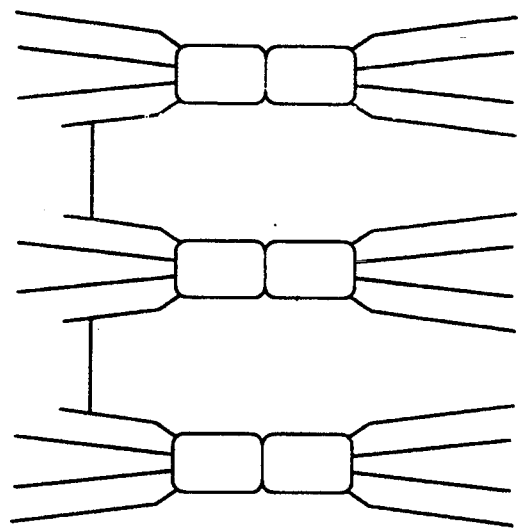
FIGS. 1a through 1c represent depictions of sucrose octaester monomer, dimer and trimer, respectively.

By "nondigestible" is meant that only about 70% or less of a material so characterized can be digested by the body. Preferably only about 20% or less, more preferably only about 1% or less of such materials can be digested. Alternatively, "nondigestible" can also mean that only about 70% or less, preferably only about 20% or less, more preferably only about 1% or less, of a material can be hydrolyzed versus a triglyceride by the enzymes in the lipase test described hereinafter in the Analytical Methods section.

As used herein, the term "thickness" of a particle is used in its conventional sense of the smallest of the three dimensions (length, width, height) of any given particle.

As used herein, the term "spherulitic" refers to substantially spherical or round, essentially three-dimensional particles.

As used herein, the term "platelet-like" refers to a substantially flat, essentially two-dimensional type of particle having length and width in the unfolded planar configuration that is substantially greater in dimension than its thickness.

As used herein, the terms "filament-like" and "rod-like" refer to elongated, essentially one-dimensional particles.

As used herein, the term "complete melting point" refers to the temperature at which all solid components have melted. All melting points referred to herein are measured by Differential Scanning Calorimetry (DSC) as described hereinafter.

As used herein, the term "crystallization temperature" refers to the temperature at which solid crystalline particles begin to form from the liquid phase.

As used herein the terms "cocrystallizable blend" and "cocrystallizable particles" refer to blends or particles wherein a polyol polyester hardstock and a crystal modifier crystallize from a liquid phase at the same time, i.e., the components of the blend or particles have similar crystallization temperatures or the crystallization temperatures are such that the hardstock and crystal modifier will crystallize simultaneously.

As used herein, the term "comprising" means various components, or steps, can be conjointly employed in the nondigestible fats compositions and processes of the present invention. Accordingly, the term "comprising" encompasses the more restrictive terms "consisting essentially of", "consisting of" and "consisting solely of".

As used herein, the term "not consisting solely of" means consisting of less than 100%, preferably consisting of less than 80%, more preferably consisting of less than 60%.

By "polyol" is meant a polyhydric alcohol containing at least 4, preferably from 4 to 12, more preferably from 4 to 8, most preferably from 6 to 8, hydroxyl groups. Polyols thus include sugars (i.e., monosaccharides, disaccharides and trisaccharides), sugar alcohols (i.e., the reduction product of sugars wherein the aldehyde or ketone group has been reduced to an alcohol), other sugar derivatives (e.g., alkyl glycosides), polyglycerols such as diglycerol and triglycerol, pentaerythritol, and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose. Preferred polyols include erythritol, xylitol, sorbitol, and glucose, with sucrose being an especially preferred polyol.

By "polyol polyester" is meant a polyol as hereinbefore defined having at least 4 ester groups, i.e., at least 4 of the hydroxyl groups of the polyol are esterified with fatty or other organic acids. Polyol esters that contain 3 or less ester groups are generally digested in (and the products of digestion are absorbed from) the intestinal tract much in the manner of ordinary triglyceride fats or oils, whereas those polyol esters which contain 4 or more ester groups are generally substantially nondigestible and consequently nonabsorbable by the human body. It is not necessary that all of the hydroxyl groups of the polyol be esterified, but it is preferable that disaccharide molecules contain no more than 3 unesterified hydroxyl groups, and more preferably no more than 2 unesterified hydroxyl groups, so that they are rendered nondigestible. Typically, substantially all (e.g., at least about 85%) of the hydroxyl groups of the polyol are esterified. For liquid polyol polyesters, preferably at least about 95% of the hydroxyl groups of the polyol are esterified. In the case of sucrose polyesters, typically from about 7 to 8 of the hydroxyl groups of the polyol are esterified.

By "ester group" is meant a moiety formed from the reaction of a hydroxyl group with an organic acid or acid derivative which moiety contains fatty acid and/or other organic radicals having at least 2 carbon atoms, typically at least 8 carbon atoms, more typically at least 12 carbon atoms, most typically at least 16 carbon atoms. Representative examples of such fatty and other organic acid radicals include acetic, propionic, butyric, caprylic, captic, lauric, myristic, myristoleic, palmitic, palmitoleic, stearic, oleic, elaidic, ricinoleic (hydroxyl group unesterified or esterified with fatty or other organic acids), linoleic, linolenic, eleostearic, arachidic, arachidonic, behenic, lignoceric, erucic, and cerotic fatty acid radicals and other organic acid radicals including aromatic ester-forming radicals such as benzoic or toluic; branched chain radicals such as isobutyric, neooctanoic or methyl stearic; ultra-long chain saturated or unsaturated fatty acid radicals such as tricosanoic or tricosenoic; cyclic aliphatics such as cyclohexane carboxylic and polymeric ester-forming radicals such as polyacrylic and dimer fatty acid. These fatty or other organic acid radicals can be derived from naturally occurring or synthetic acids. The acid radicals can be saturated or unsaturated, including positional or geometrical isomers, e.g. cis- or trans-isomers, straight chain or branched chain aliphatic or aromatic, and can be the same for all ester groups, or can be mixtures of different acid radicals.

All percentages, ratios and proportions used herein are by weight unless otherwise specified.

B. Liquid Nondigestible Oil

A key component of the nondigestible fat compositions herein is a liquid nondigestible oil having a complete melting point below about 37° C. Suitable liquid nondigestible edible oils for use herein include liquid polyol polyesters (see Jandacek; U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of malonic and succinic acid (see Fulcher, U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 9, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); and liquid esters of epoxide-extended polyols (see White et al; U.S. Pat. No. 4,861,613; Issued Aug. 29, 1989); as well as liquid polydimethyl siloxanes (e.g., Fluid Silicones available from Dow Corning). All of the foregoing patents relating to the liquid nondigestible oil component are incorporated herein by reference.

Preferred liquid nondigestible oils are the liquid polyol polyesters that comprise liquid sugar polyesters, liquid sugar alcohol polyesters, and mixtures thereof. The preferred sugars and sugar alcohols for preparing these liquid polyol polyesters include erythritol, xylitol, sorbitol, and glucose, with sucrose being especially preferred. The sugar or sugar alcohol starting materials for these liquid polyol polyesters are preferably esterified with fatty acids containing from 8 to 22 carbon atoms, and most preferably from 8 to 18 carbon atoms. Suitable naturally occurring sources of such fatty acids include corn oil fatty acids, cottonseed oil fatty acids, peanut oil fatty acids, soybean oil fatty acids, canola oil fatty acids (i.e. fatty acids derived from low erucic acid rapeseed oil), sunflower seed oil fatty acids, sesame seed oil fatty acids, safflower oil fatty acids, fractionated palm oil fatty acids, palm kernel oil fatty acids, coconut oil fatty acids, tallow fatty acids and lard fatty acids.

The nondigestible polyol polyesters that are liquid are those which have minimal or no solids at body temperatures (i.e., 98.6° F., 37° C.). These liquid polyol polyesters typically contain ester groups having a high proportion of $C_{12}$ or lower fatty acid radicals or else a high proportion of $C_{18}$ or higher unsaturated fatty acid radicals. In the case of those liquid polyol polyesters having high proportions of unsaturated $C_{18}$ or higher fatty acid radicals, at least about half of the fatty acids incorporated into the polyester molecule are typically unsaturated. Preferred unsaturated fatty acids in such liquid polyol polyesters are oleic acid, linoleic acid, and mixtures thereof.

The following are nonlimiting examples of specific liquid polyol polyesters suitable for use in the present invention: sucrose tetraoleate, sucrose pentaoleate, sucrose hexaoleate, sucrose heptaoleate, sucrose octaoleate, sucrose hepta- and octaesters of unsaturated soybean oil fatty acids, canola oil fatty acids, cottonseed oil fatty acids, corn oil fatty acids, peanut oil fatty acids, palm kernel oil fatty acids, or coconut oil fatty acids, glucose tetraoleate, the glucose tetraesters of coconut oil or unsaturated soybean oil fatty acids, the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

The liquid polyol polyesters suitable for use in the compositions herein can be prepared by a variety of methods known to those skilled in the art. These methods include: transesterification of the polyol (i.e. sugar or sugar alcohol) with methyl, ethyl or glycerol esters containing the desired acid radicals using a variety of catalysts; acylation of the polyol with an acid chloride; acylation of the polyol with an acid anhydride; and acylation of the polyol with the desired acid, per se. (See, for example, U.S. Pat. Nos. 2,831,854, 3,600,186, 3,963,699, 4,517,360 and 4,518,772, all of which are incorporated by reference. These patents all disclose suitable methods for preparing polyol polyesters.)

C. Solid Nondigestible Oil Loss Control Particles

A second key component of the nondigestible fat compositions herein comprises relatively small nondigestible solid particles of certain polyol polyester material that are dispersed in the liquid nondigestible oil to control or prevent passive oil loss. These particles can be in a variety of forms and shapes, including spherulitic, platelet-like, filament-like or rod-like, or combinations of these various shapes, but are typically spherulitic or platelet-like. The thickness of these particles is typically about 1 micron or less. Thinner particles, however, are preferred from the standpoint of providing more efficient passive oil loss control of the liquid nondigestible oil component of the compositions herein. Accordingly, these particles preferably have a thickness of about 0.1 micron or less, more preferably about 0.05 micron or less. These particles also have a complete melting point of above about 37° C. but below about 500° C., preferably above about 50° C. but below about 200° C., more preferably above about 60° C. but below about 100° C.

The polyol polyester material which forms these nondigestible particles should have a complete melting point as measured by the Differential Scanning Calorimetry (DSC) described hereinafter in the Analytical Methods section which is sufficiently high such that the nondigestible particles themselves will have the hereinbefore specified melting point characteristics when such particles are dispersed in the liquid nondigestible oil. For example, a polyol polyester material having a complete melting point right at 37° C. may not form solid particles having a complete melting point above about 37° C. when such particles are dispersed in the liquid nondigestible oil. Thus, in some cases, the complete melting point of the neat polyol polyester material may have to be slightly higher than 37° C., e.g., about 40° C. or higher, in order to form solid particles having a complete melting point of 37° C. when such particles are combined with the liquid nondigestible oil.

These nondigestible particles can generally be dispersed as discrete, unaggregated entities in the liquid nondigestible oil. However, these nondigestible particles can also cluster together to form much larger aggregates which are dispersed in the liquid nondigestible oil. This is particularly true of those nondigestible particles that are platelet-like in form. Aggregates of platelet-like nondigestible particles typically assume a spherulitic shape that is porous in character and thus capable of entrapping significant amounts of liquid nondigestible oil. It is believed that this porous structure and its concomitant ability to entrap large amounts of liquid nondigestible oil is why these aggregated, platelet-like particles, while not as efficient as the particles in unaggregated form, can provide very effective and efficient passive oil loss control.

The sol id nondigestible particles dispersed in the nondigestible liquid oil component to provide passive oil loss control can be formed from a wide variety of both organic and inorganic materials. Descriptions are set forth as follows of preferred materials which can be used to form solid nondigestible particles that can be employed in the nondigestible fat compositions herein:

1) Diversely Esterified Polyol Polyesters

One preferred type of solid nondigestible particles for use in the compositions herein comprises certain polyol polyesters which have their ester group-forming fatty acid radicals selected so that the polyol backbone does not contain all of a single type of ester group. Generally, these polyol polyesters contain two basic types of ester groups. These are (a) groups formed from certain long chain saturated fatty acids radicals, and (b) groups formed from acid radicals which are "dissimilar" to the long chain saturated fatty acid radicals. When these "dissimilar" fatty acid and/or other organic acid radicals are esterified onto a polyol that contains or will contain long chain saturated fatty acid radicals, they will introduce diverse esterification into the resulting polyol polyester molecule, thereby altering the crystal structure as these molecules pack together. This diverse esterification can be due to differences in length of the ester-forming acid radicals (e.g., short chain versus long chain), or other steric factors, e.g. branched chain versus straight chain, unsaturated chain versus saturated chain, aromatic chain versus aliphatic chain, etc. Polyol polyesters containing these "long chain" and "dissimilar" ester groups are called "diversely esterified polyol polyesters".

a) Long Chain Saturated Fatty Acid Component of the Diversely Esterified Polyol Polyester Oil Loss Control Particles The ester groups of the diversely esterified nondigestible polyol polyester particles must include those formed from certain long chain saturated fatty acid radicals. Suitable long chain saturated fatty acid radicals comprise those which contain from 20 to 26, most preferably 22, carbon atoms. The long chain saturated fatty acid radicals can be used singly, or in mixtures with each other, in all proportions. In addition, straight chain (i.e. normal) fatty acid radicals are typically used as the long chain saturated fatty acid radicals which form ester groups on the diversely esterified polyol polyester. Examples of suitable long chain saturated fatty acid radicals include eicosanoate (arachidate), docosanoate (behenate), tetracosanoate (lignocerate), and hexacosanoate (cerotate).

b) Dissimilar Ester-Group Forming Component of the Diversely Esterified Polyol Polyester Oil Loss Control Particles The ester groups of the diversely esterified nondigestible polyol polyester particles must also include those formed from certain dissimilar acid radicals as hereinbefore defined. Such dissimilar radicals can comprise $C_{12}$ or higher unsaturated fatty acid radicals or $C_2$–$C_{12}$ saturated fatty acid radicals or mixtures thereof, or can be of the fatty-fatty acid type, the aromatic ester-forming type, or other types such as ultra-long chain or various branched cyclic or substituted acid radicals. No matter what type of dissimilar acid radical is utilized to form the diversely esterified polyol polyester oil loss control particles herein, such particles should not consist solely of diversely esterified solid polyol polyesters where the dissimilar ester-forming acid radicals comprise $C_{12}$ or higher unsaturated fatty acid radicals, $C_2$–$C_{12}$ saturated fatty acid radicals or mixtures thereof. Nondigestible particles used in the compositions of the present invention should preferably comprise no more than about 80%, and typically no more than 60% of such diversely esterified solid polyol polyesters having these particular long chain unsaturated and/or short chain saturated fatty acid radicals as the dissimilar acid radical substituent.

i) Long Chain Unsaturated Radicals

A preferred class of "dissimilar" acid radicals comprises long chain unsaturated fatty acid radicals. Suitable long chain unsaturated fatty acid radicals contain at least 12, preferably from 12 to 26, more preferably from 18 to 22, most preferably 18 carbon atoms.

Examples of suitable long chain unsaturated fatty acid radicals for use in forming diversely esterified polyol polyesters include monounsaturated fatty acid radicals such as lauroleate, myristoleate, palmitoleate, oleate, elaidate, and erucate, and polyunsaturated radicals such as linoleate, arachidonate, linolenate, eicosapentaenoate, and docosahexaenoate. In terms of oxidative stability, the monounsaturated and diunsaturated fatty acid radicals are preferred.

ii) Short Chain Saturated Radicals

Another preferred class of "dissimilar" acid radicals comprises short chain saturated fatty acid radicals. Suitable short chain saturated fatty acid radicals contain from 2 to 12, preferably from 6 to 12, and most preferably 8 to 12, carbon atoms. Examples of suitable short chain saturated fatty acid radicals are acetate, butyrate, hexanoate (caproate), octanoate (caprylate), decanoate (caprate), and dodecanoate (laurate).

iii) Fatty-Fatty Acid Dissimilar Ester-Forming Radicals

Another suitable class of dissimilar ester groups comprises those formed by what are designated herein as fatty-fatty acid radicals. As used herein, the term "fatty-fatty acid radical" refers to a fatty acid radical having at least one hydroxyl group that is itself esterified with another fatty or other organic acid.

Examples of fatty acids containing a hydroxyl group that can be esterified with another fatty acid include 12-hydroxy-9-octadecenoic acid (ricinoleic acid), 12-hydroxy-octadecanoic acid, 9-hydroxy-octadecanoic acid, 9-hydroxy-10,12-octadecadienoic acid, 9-hydroxy-octadecanoic, 9,10-dihydroxyoctadecanoic acid, 12, 12-dihydroxyeicosanoic acid, and 18-hydroxy-9,11,13-octadecatrienoic acid (kamolenic acid). Ricinoleic acid is a preferred hydroxy-fatty acid. Castor oil is a convenient source of ricinoleic acid. Other sources of hydroxy-fatty acids include hydrogenated castor oil, strophanthus seed oils, calendula officinalis seed oils, hydrogenated strophanthus seed oils and hydrogenated calendula officinalis seed oils, cardamine impatiens seed oils, kamala oils, mallotus discolor oils, and mallotus claoxyloides oils.

Hydroxy fatty acids can also be synthetically prepared by oxidative hydroxylation of unsaturated fatty acids using oxidizing agents such as potassium permanganate, osmium tetroxide, and peracids such as peracetic acid. Using this method, 9,10-dihydroxyoctadecanoic acid can be made from oleic acid, and 9,10,12,13-tetrahydroxy-octadecanoic acid can be made from linoleic acid. Another way to prepare hydroxy fatty acids, such as 10-hydroxy-12-cis-octadecenoic and 10-hydroxy-12 cis, 15-cis-octadecactanoic acids, synthetically is by conversion of fatty acids such as linoleic and linolenic via microorganisms such as Nocardia Cholesteroliim.

Suitable acids for esterification onto the hydroxyl group of the hydroxy-fatty acid radical can be derived from either synthetic or natural, saturated or unsaturated fatty and other organic acids and include positional and geometric isomers. Suitable preferred saturated fatty acids for preparation of the fatty-fatty acid radicals include, for example, acetic, butyric, caproic, caprylic, capric, lauric, myristic, palmitic, stearic, arachidic, behenic, isomyristic, isomargaric, and hydroxystearic. Suitable preferred unsaturated fatty acids for preparation of the fatty-fatty acid radicals include, for example, myristoleic, palmitoleic, ricinoleic, linoleic, oleic, elaidic, linolenic, eleostearic, arachidonic, erucic, and erythrogenic acids.

Mixtures of fatty acids derived from soybean oil, palm oil, cottonseed oil, safflower oil, rapeseed oil (high erucic acid), canola (low erucic acid), and corn oil are especially preferred for preparation of the fatty-fatty acid radicals herein. The fatty acids can be used "as is" and/or after hydrogenation, and/or isomerization, and/or purification. For example, rapeseed provides a good source for $C_{22}$ fatty acid. $C_{16}$–$C_{18}$ fatty acids can be provided by tallow, soybean oil, or cottonseed oil. Shorter chain fatty acids can be provided by coconut, palm kernel, or babassu oils. Corn oil, lard, olive oil, palm oil, peanut oil, castor oil, safflower seed oil, sesame seed oil, and sunflower seed oil are examples of other natural oils which can serve as the source of these fatty acids that are esterified onto the hydroxyl group of the hydroxy-fatty acid radical.

Other suitable organic acid radicals for esterification onto the fatty acid radical containing the hydroxyl group to thereby form fatty-fatty acid radicals include aromatic esters such as benzoic or toluic; branched chain radicals such as isobutyric, neooctanoic or methyl stearic; ultra-long chain saturated or unsaturated fatty acid radicals such as triconsanoic or triconsenoic; cyclic aliphatics such as cyclohexane carboxylic; and polymeric ester-forming radicals such as polyacrylic and dimer fatty acid.

The fatty-fatty acid radicals can be prepared prior to esterification onto the polyol by transesterifying the hydroxy group with the respective fatty acids or fatty acid esters. For example, fatty-fatty radicals of ricinoleic chains can be prepared by esterifying ricinoleic methyl ester with behenic methyl esters. Preferably, an excess of behenic methyl esters is used so that the majority of ricinoleic 12-hydroxy groups are esterified with behenic chains.

A more convenient method of preparing the fatty-fatty radicals is to prepare them in situ before, or preferably during, the esterification of the polyol. For example, one equivalent of sucrose, 1 equivalent of castor oil methyl esters, and 7 equivalents of methyl esters made from hydrogenated and distilled high erucic rapeseed methyl esters could be reacted together, along with a functional amount of emulsifier and basic catalyst. When these ingredients are heated under a vacuum, the esterification of the hydroxy fatty methyl esters (primarily ricinoleic methyl esters) will occur at about the same time as the esterification of the fatty acid methyl esters with the sucrose. Since the majority of the fatty acid methyl esters are behenic methyl esters in this example, most of the 12-hydroxy groups on the ricinoleic methyl esters will esterify with the behenic methyl esters.

iv) Aromatic Dissimilar Ester-Forming Radicals

Another suitable class of dissimilar ester groups comprises those formed from aromatic radicals. Aromatic radicals can be derived from a wide variety of aromatic compounds including benzoic compounds such as benzoic or toluic acid; amino benzoic compounds such as amino benzoic and aminomethyl benzoic acids; hydroxybenzoic compounds such as hydroxybenzoic, vanillic and salicylic acids; methoxybenzoic compounds such as anisic acid; acetoxyphenylacetic compounds such as acetylmandelic acid; and halobenzoic compounds such as chlorobenzoic, dichlorobenzoic, and fluorobenzoic acids. Other aromatic ester-forming radicals may also be employed such as acetyl benzoic, cumic, phenylbenzoic, and nicotinic; and polycyclic aromatic radicals including fluorene carboxylic, and indole carboxylic. These aromatic-type dissimilar acid radicals can be used singly, or in mixtures with each other, in all proportions.

v) Other Dissimilar Ester-Forming Radicals

Various other ester-forming radicals can also serve as those which form the dissimilar ester groups of the diversely esterified polyol polyester particles used herein. Such other radicals can be branched alkyl chain, e.g. methyl alkyl radicals such as methyl stearic, isobutyric, and isovaleric; ultra-long chain saturated or unsaturated radicals including tricotanoic and tricontenoic; cyclic aliphatic radicals including cyclobutane carboxylic, cyclopentane carboxylic, cyclohexane carboxylic, cyclohexane acetic, and hydroxycyclic such as ascorbic; polycyclic aliphatic such as abietic; polymeric ester-forming radicals such as polyacrylic and dimer fatty acid; and alkyl chain radicals with "functional" groups attached including haloalkyl radicals such as chlorostearic, chlorocaprylic, chloroacetic, bromostearic, bromocaprylic, and bromoacetic; aminoalkyl radicals such as aminocaprylic and aminostearic; phenoylalkyl radicals such as benzoylbutyric; and phenylalkyl radicals such as phenyl acetic. These "other" dissimilar radicals can also be used singly, or in mixtures with each other, in all proportions.

c) Preparation of Diversely Esterified Polyol Polyesters

The diversely esterified polyol polyesters of the type hereinbefore described can be prepared by esterifying the desired polyol with the requisite type of ester-forming radicals. Mixed fatty acid radicals from oils which contain substantial amounts of the desired long chain saturated and/or dissimilar fatty acids can be used as the sources of fatty acid radicals in preparing the solid polyol polyesters used in the present invention. The mixed fatty acids from such oils should preferably contain at least about 30% (preferably at least about 50%, and most preferably at least about 80%) of the desired dissimilar and/or long chain saturated fatty acids. For example, palm kernel oil fatty acids can be used instead of a mixture of the respective pure saturated fatty acids having from 8 to 12 carbon atoms. Similarly, rapeseed oil fatty acids or soybean oil fatty acids can be used instead of a mixture of the respective pure monounsaturated and polyunsaturated fatty acids having 12 to 26 carbon atoms, and hardened (i.e., hydrogenated) high erucic rapeseed oil fatty acids can be used in place of a mixture of the respective pure long chain saturated fatty acids having from 20 to 26 carbons. Preferably, the $C_{20}$ and higher acids (or their derivatives-e.g., methyl esters) are concentrated, for example, by distillation.

The diversely esterified solid nondigestible polyol polyester particles used herein and prepared from the various sources of acid radicals as outlined hereinbefore will generally contain at least about 15% preferably at least about 30% more preferably at least about 50%, most preferably at least about 80%, of the long chain saturated fatty acid radicals along with at least some of the dissimilar acid radicals. In the diversely esterified polyol polyester materials used herein, the molar ratio of dissimilar radicals to long chain saturated fatty acid radicals can range from about 1:15 to about 2:1. Preferably, this molar ratio ranges from about 1:7 to about 5:3, most preferably from about 1:7 to about 3:5.

The diversely esterified solid polyol polyesters useful herein can be made according to prior known methods for preparing polyol polyesters. Since the sucrose polyesters are the preferred solid polyol polyesters for use in the present invention, such preparation will be exemplified primarily by these materials. One such method of preparation comprises reacting the acid chlorides or acid anhydrides of the desired ester-forming acids or the acids per se with sucrose, preferably using a sequential esterification process. In this sequential esterification process, sucrose is initially partially esterified with the dissimilar acid chlorides, followed by complete or substantially complete esterification of this initial reaction product with the long chain saturated fatty acid chlorides, in that order, or in the reverse order. (See Letton; European Patent 311,154; Published Apr. 12, 1989.

Another method for preparing these solid diversely esterified polyol polyesters is by the process of reacting the methyl esters of the desired ester-forming acids with sucrose in the presence of a fatty acid soap and a basic catalyst such as potassium carbonate. (See, for example, Rizzi et al; U.S. Pat. No. 3,963,699; Issued Jun. 15, 1976; Volpenhein; U.S. Pat. f the desired ester-forming acids with sucrose in the presence of a fatty acid soap and a basic catalyst such as potassium carbonate. (See, for example, Rizzi et al; U.S. Pat. No. 3,963,699; Issued Jun. 15, 1976; Volpenhein; U.S. Pat. No. 4,518,772; Issued May 21, 1985, and Volpenhein; U.S. Pat. No. 4,517,360; Issued May 14, 1985, all of which patents are incorporated by reference.) When using the methyl ester route to prepare these diversely esterified sol id polyol polyesters having mixed dissimilar acid radicals and long chain saturated fatty acid radicals, the octaester of one of the types of acids (e.g., dissimilar acids, or long chain saturated fatty acids) can be prepared first, followed by partial interesterification of this initial reaction product with the methyl ester of the other type of acid. In a preferred way of practicing this methyl ester process, the methyl esters of the long chain saturated fatty acids are reacted with sucrose in a first stage at about 135° C. to obtain partial esters of sucrose. The methyl esters of the dissimilar acids are then added to the reaction and the temperature is dropped to 90°-120° C., as necessary (and reflux, if required) to achieve the desired degree of esterification.

When using the methyl ester route to prepare these diversely esterified solid polyol polyesters having mixed dissimilar acid and long chain saturated fatty acid radicals, the dissimilar and long chain saturated methyl esters are blended in the desired ratio and reacted with sucrose by transesterification to obtain the sucrose esters of mixed dissimilar/long chain saturated fatty acids.

2) Polyol Polyester Polymers

Another preferred type of solid nondigestible particles for use in the compositions herein are certain polyol polyesters which comprise at least some material in the form of polymerized polyesters, i.e., polyol polyester polymers. Polyol polyester polymers for purposes of this invention are those polyol polyester materials formed by polymerizing a polyol polyester monomer to provide a molecule having at least two separate esterified polyol moieties linked by covalent bonds between ester groups of these different polyol moieties. For example, two sucrose octabehenate monomers could be cross-linked between fatty acids to form a polymer. Repeating units of such polyol polyester polymers can be the same or different such that the generic term "polymer" in this context includes the specific term "copolymer". The number of repeating monomer (or comonomer) units which make up such polyol polyester polymers can range from about 2 to 20, preferably from about 2 to 12. Depending on the method of preparing them, the polyol polyester polymers are frequently oligimers containing from 2 to 4 monomeric units, i.e., are dimers, trimers, or tetramers. The most typical type of polyol polyester polymer for use herein is dimer.

Figure 1B:
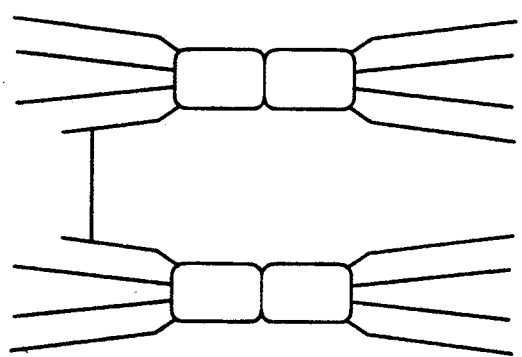
Figure 1A:
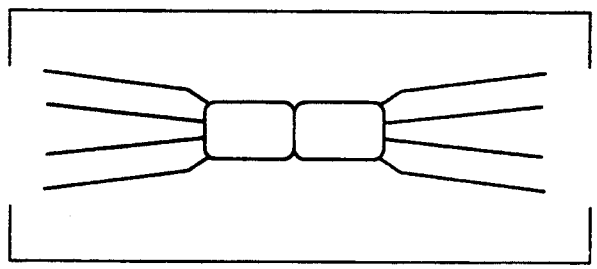

As with the liquid nondigestible oil component of the compositions herein, the most preferred polyol for forming the polyol polyester polymer component comprises sucrose. When sucrose is used, furthermore, it is preferably completely esterified with fatty acid or other ester group-forming acid radicals. Using sucrose as the polyol, completely esterified sucrose polyester monomer, dimer, and trimer are shown schematically in FIGS. 1a, 1b, and 1c, respectively. When sucrose is the polyol and the fatty acid ester-forming radicals are selected as hereinafter described in greater detail, the sucrose polyester polymers used in the nondigestible fat compositions herein can advantageously have a number average molecular weight of from about 4000 to about 60,000, preferably from about 4000 to about 36,000, more preferably from about 5000 to about 12,000.

The nature of the ester-forming radicals which form the polyol polyester polymer materials is also important in determining the suitability of such polyol polyester polymer materials for use in the fat compositions herein. For purposes of this invention, at least about 15%, preferably at least about 45%, more preferably at least about 75%, and most preferably at least about 90% of the hydroxyl groups of the polyol polyester polymer material should be esterified with long chain ($C_{20}$ and higher) saturated fatty acid radicals.

The polymer-containing polyol polyester material which forms the solid particles for use in the fat compositions herein may also comprise unpolymerized polyol polyester monomer material. Such monomers are those which contain only one polyol moiety per molecule, which polyol contains 4 to 8 hydroxyl groups, at least 4 of which are esterified. The ester-forming acid radicals on such polyol polyester monomers are, like the ester groups on the polymer materials, also preferably formed from long chain ($C_{20}$ and higher) saturated fatty acid radicals in the amounts hereinbefore specified for the polymer materials. Further, some of the ester groups of the polyol polyester monomer material may be formed by esterifying the single polyol moiety with polymerized (e.g., dimerized) fatty acid radicals.

Suitable long chain saturated fatty acid radicals for use in preparing the polyol polyester polymers and monomers used herein include those hereinbefore described for preparing the diversely esterified polyol polyesters. As in the case of the diversely esterified polyol polyesters, mixed fatty acid radicals from source oils which contain substantial amounts of the desired long chain saturated fatty acids (i.e, at least about 30%, preferably at least about 50%, more preferably at least about 80%) can be used as sources of acid radicals in preparing these polyol polyester polymers.

Suitable polyol polyester material which forms the solid nondigestible particles used in the fat compositions herein will generally comprise from about 1% to 100% of the polyol polyester polymer component and from 0% to about 99% of the unpolymerized polyol polyester monomer component. Preferably, this solid polyol polyester material comprises from about 10% to about 100% of the polyol polyester polymer component and from about 0% to about 90% of the monomer component. More preferably, such material comprises from about 30% to 100% of the polymer component and from 0% to about 70% of the monomer component. Most preferably, such material comprises from about 50% to 100% of the polymer component and from 0% to about 50% of the monomer component.

The solid polyol polyester material suitable for forming the solid particles used herein must contain at least some polyol polyester polymer. One way to prepare this material is by synthesizing monomeric polyol polyester according to known polyol esterification, transesterification and/or interesterification methods and by then polymerizing these monomers. The polymerization step can be initiated and promoted by any of a number of well known methods, including, but not limited to, photochemical reactions and reactions with transition metal ions, heat or free radical initiators such as ditert-butyl peroxide.

Alternatively, polyol polyester polymers can be prepared directly by esterifying and/or interesterifying the polyol material with polybasic polymerized fatty acids or their derivatives. For example, the polymer polyester polymers could be prepared by reacting the acid chlorides or acid anhydrides of the desired esterifying polymer acids with sucrose, preferably using a sequential esterification process in the manner described hereinbefore for the preparation of diversely esterified polyol polyesters. The polyol polyester polymers could also be prepared by reacting the methyl esters of the desired polymer acids with sucrose in the presence of a fatty acid soap and a basic catalyst such as potassium carbonate in the manner described hereinbefore for the preparation of diversely esterified polyol polyesters.

When using the foregoing methods for preparing sucrose polyester material containing both unpolymerized and polymerized fatty acid groups, the molar ratio of unpolymerized to polymerized fatty acids in the resulting sucrose material can range from about 2:6 to about 4:4.

When using the acid chloride or methyl ester procedures hereinbefore described to esterify the polyol with already polymerized fatty acids, a wide variety of prepolymerized fatty acid materials can be used. One such class of suitable polymerized fatty acids comprises longchain, aliphatic, dibasic acids having from about 28 to about 44 carbon atoms in their molecules. They are generally formed from unsaturated fatty acids having from about 14 to about 22 carbon atoms which can be polymerized. For example linoleic acid can be polymerized by heating to form linoleic acid dimer as follows:

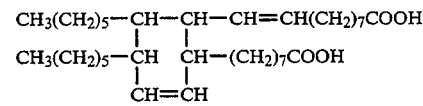

Common examples of polymerizable acids of this type are those containing two or more double bonds (polyunsaturated acids) such as the octadecadienoic acids containing two double bonds, for example, the above-mentioned linoleic acid, and the octadecatrienoic acids containing 3 double bonds, for example, linolenic and eleostearic acids. Other common polymerizable polyunsaturated acids having from about 14 to about 22 carbon which can be used to esterify polyols and thereby form the polyol polyester polymers herein are octadecatrienoic acid (e.g., licanic acid), actadectetraenoic acid (e.g., parinaric acid), eicosadienoic acid, eicostetraenoic acid (e.g., arachidonic acid), 5,13-docosadienoic acid and clupanodonic acid. Monounsaturated fatty acids, such as oleic. elaidic and erucic acids, can also be used in preparing suitable long chain fatty acid dimers which in turn can then be used to form the the solid polyol polyester polymer particles used in the present invention.

Mixed fatty acid radicals from source oils which contain substantial amounts of the desired polymerizable polyunsaturated or monounsaturated fatty acids can be used as sources of acid radicals in preparing the polyol polyester polymer materials used to form the solid particles used in the present invention. The mixed fatty acids from such source oils should preferably contain at least about 30% (more preferably at least about 50%, most preferably at least about 80%) of the desired polymerizable polyunsaturated or monounsaturated fatty acids.

Illustrative of natural sources which are rich in linoleic acid are soybean oil, cottonseed oil, peanut oil, corn oil, sesame seed oil, sunflower seed oil, safflower oil, linseed oil and perrilla oil. Oiticica oil is a particularly good source of licanic acid and tung oil contains a high concentration of eleostearic acid. Fish oils, such as herring, menhaden, pilchard, salmon and sardine oil are also suitable sources of polymerizable acids, particularly the higher fatty acids such as arachidonic and clupanodonic acids. Other oils such as tall oil, dehydrated castor oil, olive oil and rapeseed oil also contain significant proportions of suitable unsaturated acids. For example, olive oil is rich in oleic acid and rapeseed oil is rich in erucic acid.

Preferred polybasic polymerized fatty acids and fatty acid derivatives for use in preparing polymer-containing polyol polyesters include dibasic acids produced by dimerization of the fatty acids or fatty acid lower esters derived from polyunsaturated vegetable oils such as soybean oil or cottonseed oil or from animal fats such as tallow.

All of the foregoing types of polybasic polymerized fatty acids may themselves be made by a variety of methods known to those skilled in the art. (See Lutton; U.S. Pat. No. 3,353,967; Issued Nov. 21, 1967, Goebel; U.S. Pat. No. 2,482,761; Issued Sep. 27, 1949, Harrison et al; U.S. Pat. No. 2,731,481; Issued Jan. 17, 1956 and Barrett et al; U.S. Pat. No. 2,793,219; Issued May 21, 1957, all of which are incorporated herein by reference.)

As noted, a mixture of both polymerized and unpolymerized polyol polyester material can be prepared by reacting the polyol with both polymerized and unpolymerized esterifying fatty acids or fatty acid derivatives. In a preferred method for preparing particularly desirable solid sucrose polyester material comprising sucrose polyester polymers, fractionated or unfractionated high erucic acid rapeseed (HEAR) methyl esters are partially polymerized, hardened and then reacted with sucrose. Another method of making these especially desirable solid sucrose polyesters is to make liquid sucrose polyester material esterified with fatty acid groups of high erucic acid rapeseed oil by a conventional process, to then partially polymerize the resulting liquid sucrose polyester material, and to then harden the resulting polymerized material.

3) Polyglycerol Esters

A third type of solid nondigestible particle for use in the compositions herein comprises certain polyglycerol esters. The polyglycerol esters used to form the fat compositions of the present invention contain at least about 2 glycerol moieties, more preferably from about 3 to 10 glycerol moieties, even more preferably from 4 to 8 glycerol moieties, and most preferably from 4 to 6 glycerol moieties. Typically mixtures of polyglycerol esters are employed have an average degree of glycerine polymerization (n-bar) as hereinafter defined in the Analytical Methods section of from about 2 to 10, preferably from about 3 to 8, more preferably from about 3 to 6. The distribution of the number of glycerol moieties in such polyglycerol ester mixture may be narrow or broad. Typically at least about 30% of the hydroxyl groups of the polyglycerol esters useful herein are esterified with fatty acids. Preferably at least about 50% of the hydroxyl groups are esterified. The percent esterification of the polyglycerol ester material used herein can be determined in the manner set forth hereinafter in the Analytical Methods section.

The ester groups which form the solid polyglycerol ester component herein comprise long chain ($C_{16}$-$C_{26}$) fatty acid radicals with at least 40% of these long chain fatty acids being saturated and having at least 18 carbon atoms. Preferably, at least about 50% of the long chain fatty acids are saturated and have at least 18 carbon atoms, more preferably at least about 75% of the long chain fatty acids are saturated and have at least 18 carbon atoms, and most preferably at least about 85% of the long chain fatty acids are saturated and have at least 18 carbon atoms.

The fatty acid radicals forming the ester groups on the polyglycerol ester herein may be saturated or unsaturated. The polyglycerol ester can, in fact, be further characterized by specifying an Iodine Value which is a measure of the degree of unsaturation of the fatty acids which form the ester groups. These polyglycerol esters preferably have an Iodine Value of less than 50, preferably less than about 20, more preferably less than about 10, and most preferably less than about 5.

Mixed fatty acids from source oils (e.g., soybean oil, cottonseed oil, safflower, rapeseed oil, canola, corn oil, sunflower oil and tallow) which contain the desired fatty acids can be used to form the fatty acid radicals of the ester groups of the polyglycerol ester materials used herein. For example, hardened (i.e., hydrogenated) high erucic rapeseed oil fatty acids can be used instead of pure behenic fatty acid. The fatty acids can be use "as is" and/or after hydrogenation, and/or isomerization, and/or purification. Preferably, the behenic acid (or its derivatives-e.g., methyl esters) are concentrated, for example, by distillation.

The solid polyglycerol ester materials can be made according to the same known methods for preparing polyol polyesters described herein above for the preparation of the diversely esterified polyol polyester and the polyol polyester polymers.

4) Cocrystallized Blend of Hardstock and Crystal Modifier

These dispersed nondigestible particles can also consist essentially of a cocrystallized blend of: (1) a nondigestible solid polyol polyester hardstock; and (2) a crystal modifier. The particular ratio of hardstock to crystal modifier in this cocrystallized blend will depend upon the specific hardstock and/or crystal modifier selected, the specific size of the solid nondigestible particles which are to be dispersed in the oil, and the specific passive oil loss control properties desired. Ratios of hardstock to crystal modifier of from about 95:5 to about 20:80 will frequently be suitable for providing cocrystallized particles having adequate passive oil loss control. Preferably, the ratio of hardstock to crystal modifier is from about 95:5 to about 25:75, more preferably from about 90:10 to about 40:60, and most preferably from about 80:20 to about 60:40.

A) Hardstock Component of Particle-Forming Blend

The nondigestible solid polyol fatty acid polyester hardstocks useful in forming the cocrystallized blends used in the present invention are those which are solid at temperatures of about 37° C. and higher, preferably about 50° C. and higher, and most preferably about 60° C. or higher. In the absence of crystal modifiers to be described hereafter, these nondigestible polyol polyester hardstocks are those materials which normally tend to form spherulitic particles having a diameter of about 3 microns or larger in the liquid nondigestible oil, and typically in the range of from about 3 to about 32 microns, depending on the level of hardstock present, when crystallized in liquid nondigestible oil in the absence of a crystal modifier.

Preferred nondigestible polyol polyester hardstock materials suitable for use herein can be selected from solid sugar polyesters, solid sugar alcohol polyesters and mixtures thereof, and contain ester groups, e.g. generally 5 to 8 ester groups, which consist essentially of long chain saturated fatty acid radicals. Suitable saturated fatty acid radicals contain at least 14, preferably from 14 to 26, most preferably from 16 to 22, carbon atoms. The long chain saturated fatty acid radicals can be used singly or in mixtures with each other. In addition, straight chain (i.e. normal) fatty acid radicals are typical for the long chain saturated fatty acid radicals.

Examples of suitable long chain saturated fatty acid radicals include tetradecanoate (myristate), hexadecanoate (palmitate), octadecanoate (stearate), eicosanoate (arachidate), docosanoate (behenate), tetracosanate (lignocerate), and hexacosanoate (cerotate). Mixed fatty acid radicals from completely or substantially completely hydrogenated vegetable oils which contain substantial amounts of the desired long chain saturated fatty acids can be used as sources of fatty acid radicals in preparing the solid polyol polyesters useful in the present invention. The mixed fatty acids from such oils should preferably contain at least about 30% (more preferably at least about 50%, most preferably at least about 80%) of the desired long chain saturated fatty acids. Suitable source oils include completely or substantially completely hydrogenated soybean oil, cottonseed oil, palm oil, peanut oil, corn oil, safflower oil, sunflower oil, sesame oil, low erucic acid rapeseed oil (i.e. canola oil), and high erucic acid rapeseed oil. These oils are typically hydrogenated to an Iodine Value of about 12 or less, and preferably to an Iodine Value of about 8 or less.

Examples of solid polyol polyesters useful as hardstocks in the fat compositions of the present invention include sucrose octabehenate, sucrose octastearate, sucrose octapalmitate, sucrose heptastearate, xylitol pentastearate, galactose pentapalmitate, and the sucrose hepta- and octaesters of soybean oil and high erucic acid rapeseed oil fatty acids that have been hydrogenated to an Iodine Value of about 8 or less.

The solid polyol polyesters useful as hardstocks in the present invention can be made according to prior known methods for preparing polyol polyesters. Since the sucrose polyesters are the preferred solid polyol polyesters for use as hardstocks in the present invention, such preparation will be exemplified primarily by these materials. One such method of preparation is by reacting the acid chlorides or acid anhydrides of the respective fatty acids with sucrose. Another method for preparing these solid polyol polyesters is by the process of reacting the methyl esters of the respective fatty acids with sucrose in the presence of a fatty acid soap and a basic catalyst such as potassium carbonate. See, for example, U.S. Pat. No. 3,963,699 to Rizzi et al, issued June 15, 1976, U.S. Pat. No. 4,518,772 to Volpenhein, issued May 21, 1985, and U.S. Pat. No. 4,517,360 to Volpenhein, issued May 14, 1985, all of which are incorporated by reference.

B) Crystal Modifier Component of Particle-Forming Blend

The second essential component of the cocrystallized blend used to form the solid nondigestible particles in the nondigestible fat compositions herein is a crystal modifier. This crystal modifier material can comprise any material which is capable of inducing the solid polyol polyester hardstock materials as hereinbefore described to form smaller particles having the previously specified thicknesses, when cocrystallized appropriately in the liquid nondigestible oil as described hereinafter.

Examples of suitable types of crystal modifiers for use herein include the diversely esterified polyol polyesters, the polyol polyester polymers, and the polyglycerol ester hereinbefore described, and other materials such as fatty acid monoglycerides, naturally occurring waxes with long chain alkyl or ester groups, paraffinic hydrocarbon microcrystalline waxes and long chain alcohols. Monoglycerides are glycerol esters of fatty acid in which only one acid group is attached to the glycerol moiety. Preferred for use herein are monoglycerides of $C_{18}$ and higher saturated fatty acids. Monobehenin is particularly preferred. A preferred naturally occurring wax material is beeswax. Beeswax is wax from the honeycomb of the bee. Beeswax consists largely of myricyl palmitate, cerotic acid and esters and some high carbon paraffins.

Specific examples of suitable crystal modifier-type polyol polyesters useful in the present invention include sucrose tetrabehenate tetracaprylate, sucrose pentabehenate trilaurate, sucrose hexabehenate dicaprylate, sucrose hexabehenate dilaurate. other examples include the sorbitol hexaester of palmitoleic and arachidic fatty acid radicals in a 1:2 molar ratio, the raffinose octaester of linoleic and behenic fatty acid radicals in a 1:3 molar ratio, the maltose heptaester of a mixture of sunflower oil and lignoceric fatty acid radicals in a 3:4 molar ratio, the sucrose octaester of oleic and behenic fatty acid radicals in a 2:6 molar ratio, the sucrose octaester of lauric, linoleic and behenic fatty acid radicals in a 1:3:4 molar ratio, and the sucrose hepta- and octaesters of $C_{18}$ mono- and/or di-unsaturated fatty acid radicals and behenic fatty acid radicals in a molar ratio of unsaturated:behenic acid radicals of about 1:7 to 3:5.

D. Preparation of Nondigestible Fat Compositions Which Exhibit Minimal Passive Oil Loss To prepare the nondigestible fat compositions herein which exhibit minimal passive oil loss, the liquid nondigestible oil is combined with the particles of a suitable solid polyol polyester, or cocrystallizable blend of polyol polyester hardstock and crystal modifier hereinbefore described. The particles of polyol polyester or cocrystallizable blend are used in an amount sufficient to control or prevent passive oil loss. What constitutes "an amount sufficient to control or prevent passive oil loss" for any given fat composition depends upon the particular solid polyol polyester or cocrystallizable blend utilized therein, the particular passive oil loss control benefits desired, and the level of waxiness mouth impressions which can be tolerated for the particular end product use of the nondigestible fat composition which is formulated. Typically, the nondigestible fat composition so formed will comprise from about 60% to about 99% liquid nondigestible oil, and from about 1% to about 40% of the particles of solid polyol polyester or cocrystallizable blend. Preferably, this mixture comprises from about 80% to about 99% liquid nondigestible oil and from about 1% to about 20% of the particles of solid polyol polyester or cocrystallizable blend, more preferably from about 85% to about 99% liquid nondigestible oil and from about 1% to about 15% of the particles of solid polyol polyester or cocrystallizable blend, even more preferably from about 90% to about 99% liquid nondigestible oil and from about 1% to about 10% of the particles of solid polyol polyester or cocrystallizable blend, and most preferably from about 95% to about 99% liquid nondigestible oil and from about 1% to about 5% of the particles of solid polyol polyester or cocrystallizable blend. The use of higher levels of liquid nondigestible oil (i.e. lower levels of the particles of solid polyol polyester or cocrystallizable blend) can be desirable from the standpoint of reducing the waxiness impression left by the solid components of the nondigestible fat compositions herein. However, higher levels of the particles of solid polyol polyester or cocrystallizable blend (i.e. lower levels of liquid nondigestible oil) can be desirable from the standpoint of controlling or preventing passive oil loss associated with the ingestion of compositions containing such liquid nondigestible oils.

This combination of liquid nondigestible oil and solid polyol polyester or cocrystallizable blend is heated to a temperature sufficient to completely melt all of the solid components present in the mixture. This temperature will depend on the particular components present in the solid polyol polyester or cocrystallizable blend. Typically, this melted mixture can be obtained by heating it to a temperature which is at least about 20° C. higher than the melting point of the highest melting component. Once melted, this mixture is typically stirred to ensure its homogeneity of composition.

The melted mixture so formed can then be crystallized in a manner such that the solid polyol polyester or cocrystallizable blend forms, in the liquid nondigestible oil, dispersed nondigestible particles having the thickness and complete melting point characteristics hereinbefore described. The particular conditions for crystallizing this melted mixture to provide these dispersed nondigestible particles will depend upon the liquid nondigestible oil used, the particular solid polyol polyester or cocrystallizable blend used, and, in the case of the cocrystallizable blend, whether the polyol polyester hardstock or the crystal modifier has the higher melting point. In the typical case where the crystal modifier has a higher melting point than that of the polyol polyester hardstock, the melted mixture can be cooled to any temperature that is below the crystallization temperature of the polyol polyester hardstock. For example, if the crystal modifier has a melting point of about 70° C. while the polyol polyester hardstock has a melting point of about 60° C., cooling the melted mixture to a temperature of about 40° C., or less, preferably about 25° C. or less, more preferably about 10° C. or less, and most preferably about 0° C. or less, would be appropriate.

In the less typical situation of where the melting point of the polyol polyester hardstock is higher than that of the crystal modifier, the melted mixture should be cooled such that the crystal modifier cocrystallizes with the hardstock. If the crystal modifier melts at a significantly lower temperature than that of the polyol polyester hardstock, the melted mixture needs to be cooled to a relatively low temperature so that cocrystallization can occur. For example, if the melting point of the crystal modifier is about 10° C. and that of the polyol polyester hardstock is about 60° C., the melted mixture typically should be cooled to about 0° C. or less to cause appropriate cocrystallization.

The specific size of the polyol polyester particles formed in the fat compositions herein will be dependent upon the rate at which the heated combination of oil and dissolved solid is cooled. As used herein, cooling rate is defined as the temperature differential between (a) the heated oil/dissolved solid combination and (b) the cooled crystallized liquid/solid particle combination, divided by the time taken to create this temperature differential. Generally the greater the cooling rate employed in forming the fat compositions herein, the smaller will be the particles of solid polyol polyester material or cocrystallizable blend dispersed in such compositions. Desirable cooling rates for use in forming the fat compositions herein are typically greater than 0.6° C./min. (1° F./min.), preferably greater than 2.8° C./min. (5° F./min.), more preferably greater than 5.6° C./min. (10° F./min.), and most preferably greater than 27.8° C./min. (50° F./min.). When the nondigestible fat compositions herein are to be formed in situ, for example, within a food product of which they form a part, then the type and concentration of the fat composition components should be selected so that the cooling profile experienced by the food product will result in formulation of the desired amount and size of the particles of solid polyol polyester or cocrystallizable blend within the food product.

The formation of relatively small nondigestible particles in the case of the cocrystallizable blend is surprising since the polyol polyester hardstock normally tends to form much larger spherulitic particles in the liquid nondigestible oil. This normal tendency is believed to be due to the symmetrical nature of the polyol polyester hardstock molecules. The symmetrical nature of these molecules causes them to pack together and grow in an unrestrained, three dimensional fashion as large spherulitic particles.

By contrast, suitable crystal modifiers according to the present invention tend to have "asymmetrical" or irregular molecular structures. It is believed that the asymmetrical structure of these crystal modifier molecules interfere with the normal packing tendency of the symmetrical polyol polyester hardstock molecules during cocrystallization in the liquid nondigestible oil. This interference blocks the usual unrestrained three dimensional growth of the symmetrical hardstock molecules and thus induces restrained three dimensional growth or otherwise induces growth in, at most two dimensions, e.g., the formation of relatively thin platelet-like particles.

The formation of thin nondigestible particles according to the process of the present invention provides especially efficient passive oil loss control for the resulting fat composition.

Such efficiency permits a reduction in solids content of the nondigestible fat to relatively low levels (e.g. to from about 1 to about 15%). This reduction in solids level required for passive oil loss control, together with the minimal/no change in solids of the nondigestible particles between typical room and body temperatures, leads to nondigestible fats having a less waxy tasting impression.

Both the liquid nondigestible oil and the solid nondigestible polyol polyester components, as well as their respective concentrations, are selected in order to provide nondigestible fat compositions having a certain set of physical characteristics. In the first place, the nondigestible fat compositions of the present invention should exhibit relatively flat Solid Fat Content (SFC) profile slopes across the temperature range of from typical room temperature to body temperature, i.e. from 70° F. to 98.6° F. The SFC profile slope between these temperatures is from 0 to about −0.75 % solids/°F., preferably from 0 to about −0.5 % solids/°F., more preferably from 0 to about −0.3% solids/°F., and most preferably from 0 to about −0.1% solids/°F.

The nondigestible fat compositions of the present invention should also exhibit particular Thixotropic Area Values. These Thixotropic Area Values are determined by a procedure which reflects the apparent viscosity and thixotropy of the nondigestible fat when it is crystallized by cooling according to the cooling profile that will be encountered when the fat composition is used in any given end use food product. For example, in the case of nondigestible fats of the present invention, this can approximate the cooling profile of a potato chip, and such a cooling profile will be typical of other deep fat fried salted snack products. Nondigestible fat compositions of the present invention should typically exhibit Thixotropic Area Values of about 10 kilopascals/sec. (kPa/sec.) or greater, preferably about 25 kPa/sec. or greater, more preferably about 45 kPa/sec. or greater, even more preferably about 65 kPa/sec, and most preferably about 80 kPa/sec. or greater. Thixotropic Area Values are determined by the method described hereafter in the Analytical Methods section.

The nondigestible fat of the present invention should also exhibit minimized oil separation. As used herein, "oil separation" relates to the ability of the liquid portion of the nondigestible fat to separate from the remaining fecal matter and pool in the lower gut. When significant amounts of this separated oil pools in the large intestine, oil can pass through the anal sphincter, thus causing passive oil loss. Nondigestible fats of the present invention typically have an Oil Separation Value of about 16 grams or less, preferably about 12 grams or less, more preferably about 8 grams or less, even more preferably about 4 grams or less, and most preferably 0 grams (i.e., no separation). This oil separation value is measured by an in vitro method (described hereinafter in the Analytical Methods section) that simulates the motion and partial dehydration of fecal matter through the transverse colon and then determines the extent of bulk oil separation that occurs during such treatment of the fecal matter.

E. Food Products With Nondigestible Fat Compositions

The nondigestible fat compositions of the present invention can be used in various edible fat-containing products including foods, beverages and pharmaceuticals, either alone or in combination with other materials such as digestible fats and oils. In particular, the nondigestible fats of the present invention can be optionally formulated with a digestible triglyceride fat or oil. Generally, these formulations can comprise from about 10% to 100% nondigestible fat and from 0% to about 90% digestible triglyceride fat or oil. Preferably, these formulations comprise from about 35% to 100%, more preferably from about 50% to about 100% and most preferably from about 75% to about 100% nondigestible fat, and from 0% to about 65%, more preferably from 0% to about 50%, and most preferably from 0% to about 25%, digestible triglyceride fat or oil. Because of the potential caloric impact of these triglyceride fats or oils, it is desirable to minimize the level at which they are combined with the nondigestible fat compositions of the present invention.

As used herein, the term "triglyceride oil" refers to those triglyceride compositions which are fluid or liquid at room temperatures, i.e., at 25° C. Although not a requirement, the triglyceride oils useful in the present invention can include those which are fluid or liquid below 25° C. These triglyceride oils consist primarily of triglyceride materials, but can also include residual levels of other components such as mono- and diglycerides. To remain fluid or liquid at temperatures below 25° C., the triglyceride oil contains a minimal amount of glycerides having melting points higher than about 25° C. so as to limit the solids increase when the triglyceride oil is cooled. It is desirable that the triglyceride oil be chemically stable and resistant to oxidation.

Suitable triglyceride oils can be derived from naturally occurring liquid vegetable oils such as cottonseed oil, soybean oil, safflower oil, corn oil, olive oil, coconut oil, palm kernel oil, peanut oil, rapeseed oil, canola oil (i.e., rapeseed oil low in erucic acid), sesame seed oil, sunflower seed oil, and mixtures thereof. Also suitable are liquid oil fractions obtained from palm oil, lard and tallow by, for example, graining or directed interesterification, followed by separation of the oils. Oils predominating in glycerides of unsaturated acids may require partial or touch hydrogenation to maintain flavor, but care should be taken not to greatly increase the amount of glycerides melting above 25° C. When oils are selected which have a larger amount of solids melting between 25° and 40° C. than are desirable, it can be necessary to separate out the solids. For example, refined and slightly hydrogenated soybean oil is suitable, as well as refined cottonseed oil.

As used herein, the term "triglyceride fat" refers to those triglyceride compositions which are solid or plastic at room temperatures. These solid or plastic fats can be derived from plants or animals or can be edible synthetic fats or oils. For example, animal fats such as lard, tallow, oleo oil, oleo stock, oleo stearin and the like which are solid at room temperature can be utilized. Also, triglyceride oils, e.g. unsaturated vegetable oils, can be converted into plastic fats by partial hydrogenation of the unsaturated double bonds of fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil. See Putves et al; U.S. Pat. No. 3,355,302; Issued Nov. 28, 1967, and Darragh et al; U.S. Pat. No. 3,867,556; Issued Feb. 18, 1975 (herein incorporated by reference), for further examples of solid or plastic fats. Because the solid or plastic fats add an appreciable level of solids, their inclusion can cause adverse effects on the organoleptic properties, in particular waxiness, of the edible compositions of the present invention.

Triglyceride fats and oils useful with the nondigestible fat compositions of the present invention can include certain triglycerides in which one, two or three of the OH groups of the glycerol molecule have been substituted with acetyl, propionyl, butyryl, caproyl, caprylyl, or capryl radicals, and the remaining OH groups of the glycerol molecule (if any) have been substituted with acyl radicals of saturated or unsaturated fatty acids having from 12 to 24 carbon atoms.

The nondigestible fat materials of this invention can also be used in combination with reduced calorie medium chain and mixed medium/long chain triglycerides. See, for example, Ehrman et al; U.S. Pat. No. 4,888,196; Issued Dec. 19, 1989 and Seiden; European Patent 322,027; Published Jun. 28, 1989.

The nondigestible fat compositions of the present invention can be used in or as shortening and oil products. These shortening and oil products can be used in frying applications such as the preparation of french fried potatoes, potato chips from potato slices or fabricated potato pieces, potato sticks, corn chips, tortilla chips, donuts, chicken, fish, and fried pies (e.g. turnovers). These shortening and oil products can also be used in preparing baked goods in any form, such as mixes, shelf-stable baked goods, and frozen baked goods, including, but not limited to, cakes, granola bars, brownies, muffins, bar cookies, wafers, biscuits, pastries, pies, pie crusts, and cookies, including sandwich cookies, chocolate chip cookies, and particularly storage stable dual-texture cookies as disclosed in Hong et al; U.S. Pat. No. 4,455,333; Issued Jun. 19, 1984. These baked goods can contain fruit, cream, or other fillings. Other baked good uses include breads and rolls, crackers, pretzels, pancakes, waffles, ice cream cones and cups, yeast-raised bake goods, pizza and pizza crust, baked farinaceous snack products and other baked salted snacks.

Other edible fat-containing products which may contain the nondigestible fat compositions of the present invention include ice cream, frozen desserts, cheese, cheese spreads, meats, meat analogs, chocolate confections, salad dressings, mayonnaise, margarine, spreads, sour cream, yogurt, coffee creamer, peanut butter, extruded snacks such as corn curls, corn puffs, pellet snacks, half products and other extruded snacks based on corn or other cereal grains such as wheat, rice and the like, roasted nuts and beverages such as milkshakes.

Edible fat-containing products which can contain the nondigestible fats of this invention include noncaloric or reduced calorie sweeteners alone or in combination with bulking agents. These noncaloric or reduced calorie sweeteners include, but are not limited to, aspartame, saccharin, alitame, thaumatin, dihydrochalcones, acesulfame, and cyclamates.

Bulking or bodying agents which can also be useful in edible fat-containing products containing the fat compositions herein include partially or wholly nondigestible carbohydrates, for example, polydextrose and cellulose or cellulose derivatives, such as D, L-sugars, carboxymethylcellulose, carboxyethylcellulose, hydroxypropylcellulose, methylcellulose, hydroxypropyl methylcellulose, and microcrystalline cellulose. Other suitable bulking agents include gums (hydrocolloids), starches, dextrins, fermented whey, tofu, maltodextrins, polyols, including sugar alcohols, e.g., sorbitol and mannitol, and carbohydrates, e.g., lactose.

The edible fat-containing products containing the nondigestible fat compositions herein can also include dietary fibers. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers can be used, such as psyllium and fibers from whole citrus peel, citrus albedo, sugar beets, citrus pulp and vesicle solids, apples, apricots, and watermelon rinds.

These dietary fibers can be in a crude or purified form. The dietary fiber used can be of a single type (e.g., cellulose), a composite dietary fiber (e.g., citrus albedo fiber containing cellulose and pectin), or some combination of fibers (e.g., cellulose and a gum). The fibers can be processed by methods known to the art.

The nondigestible fat compositions of the present invention can be fortified with vitamins and minerals, particularly the fat-soluble vitamins. The fat-soluble vitamins include vitamin A, vitamin D, and vitamin E and their precursors. (See Mattson; U.S. Pat. No. 4,034,083; Issued Jul. 5, 1977, herein incorporated by reference, which discloses fat-soluble vitamins useful in fortifying polyol fatty acid polyesters.)

Various other ingredients typically present in fat products can also be included in the nondigestible fat compositions of the present invention. These other ingredients include stabilizers to help protect against oxidative deterioration at high temperatures. Silicone oils, particularly methyl and ethyl silicone oils, are useful for this purpose. Methyl silicones have also proven effective in reducing the rate of oil polymerization during frying. Other additives typically included in fat products such as minor amounts of optional flavorings, emulsifiers, anti-spattering agents, anti-sticking agents, antioxidants or the like can also be present.

F. Analytical Methods

A number of parameters used to characterize elements of the present invention are to be quantified by particular experimental analytical procedures. Each of these procedures is described in detail as follows:

1. Fatty Acid Composition of Polyol Polyesters

The fatty acid composition (FAC) of the polyol polyesters can be determined by gas chromatography, using a Hewlett-Packard Model S712A gas chromatograph equipped with a flame ionization detector and a Hewlett-Packard Model 7671A automatic sampler.

The method is applicable to methyl esters of fatty acids having 8 to 24 carbon atoms and to animal fats, vegetable oils, marine oils and fatty acids after their conversion to methyl esters. The method permits quantitative separation of mixtures containing saturated and unsaturated methyl esters. The conditions specified in this method are not suitable for determining epoxy or oxidized fatty acids or fatty acids that have been polymerized.

Apparatus 1

1. The gas chromatograph, which is commercially available, should have as a minimum the following characteristics
  (a) Column oven, capable of heating the column to at least 220° C. and of maintaining the desired temperature to within ±1° C.
  (b) Sample inlet port with minimum dead space which is independently heated to a temperature 20°–50° C. higher than column temperature.
  (c) Detectors, thermal conductivity (TC) or flame ionization (FID), separately thermostated, which can be maintained at or above column temperature.

2. Recorder—If the recorder curve is to be used to calculate the composition of the mixture analyzed, an electronic recorder of high precision is required. The characteristics of the recorder should be
  (a) Rate of response below 1.0 seconds (the rate of response is the time taken for the recording pen to pass from 0 to 90 percent following the momentary introduction of a 100 percent signal).
  (b) Chart paper width, 25 cm (10 inches) minimum.
  (c) Chart paper speed, 25–100 cm/hr (10–40 inches/hour).

3. Integrator or Calculator (optional)—Rapid and accurate calculation can be performed with the help of an electronic integrator or calculator. This must give a linear response with adequate sensitivity, and baseline correction should be consistent with good chromatographic practice. Horizontal, non-horizontal and tangential baseline correction must be controlled by selectable electronic peak logic.

4. Syringe, maximum capacity 10 μL, graduated in 0.1 μL.

5. Chromatographic Column (a) The column must be constructed of a material inert to the substances to be analyzed, glass, or failing that, stainless steel (see Notes, 1), with a length of 1 to 3 m and an interval diameter of 2 to 4 mm.

(b) Packing support, acid-washed and silanized diatomaceous earth, or other suitable inert support with a narrow range (25 μm) of grain size between the limits of 60–120 mesh (125–250 μm).

(c) Stationary phase, polyester type of polar liquid (diethylene glycol polysuccinate, butanedial polysuccinate, ethylene glycol polyadipate), or any liquid (e.g., cyanosilicones), meeting the requirements below. The stationary phase should amount to 5–20 percent of the packing. A nonpolar stationary phase, such as methyl silicone, fluid or gum, can be used for separations of fully saturated materials.

Reagents:

1. Gases
   (a) Carrier gas for TC detector, helium, minimum purity 99.95 mol %; for FID, helium, nitrogen, or argon, minimum purity 99.95 mol %.
   (b) FID, hydrogen, minimum purity 99.95 mol %; air, dry (dew point −75° F. maximum) and hydrocarbon free (less than 2 ppm hydrocarbons equivalent $CH_4$).

2. References Standards—A mixture of methyl esters, or the methyl esters of an oil of known composition, preferably similar to that of the fatty matter to be analyzed. Reference mixtures simulating most fats and oils may be obtained from Applied Science Laboratories, Inc., PO Box 440, State College, Pa. 16801. Supelco, Inc., Supelco Park, Bellefonte, Pa. 16823. Nu Chek Prep, Inc., PO Box 172, Elysian, Minn. 56028. Analabs, Inc., 80 Republic Drive, North Haven, Conn. 06473. Alltech Associates, Inc., 2501 Waukegan Road., Deerfield, Ill. 60015.

Preparation of Methyl Esters:

AOCS Official Method Ce 2-66 is recommended.

Procedure:

1. Conditioning a new column while disconnected from detector by holding it about 10° C. above its operating temperature with flow of inert gas at 20–60 mL/min. for approximately 16 hours and then an additional 2 hours at 20° C. above its operating temperature. In no case exceed the manufacturer's recommended maximum temperature.

2. Determining optimal operating conditions
   (a) In selecting the test conditions, the following variables must be taken into account: length and diameter of the column, temperature of the column, carrier gas flow, resolution required, size of the sample for analysis and time of analysis. The size of the sample should be chosen so that the assembly of detector and electrometer gives a linear response. As a rule, the following figures will lead to the desired results, viz., at least 2,000 theoretical plates for methyl stearate and its elution within about 15 minutes:

| Internal Diameter of Column | Carrier Gas Supply |
|---|---|
| 2 mm | 15–25 ml/min. |
| 3 mm | 20–40 ml/min. |
| 4 mm | 40–60 ml/min. |
| Concentration of Stationary Phase | Temperature |
| 5 percent | 175° C. |
| 10 percent | 180° C. |
| 15 percent | 185° C. |
| 20 percent | 185° C. |

(b) Where the apparatus allows, the injection port should be at a temperature of about 250°–275° C. and the detector at a temperature equal to, or higher than, that of the column.
   (c) The flow of hydrogen to the flame ionization detector is, as a rule, about 0.5 to 1 times that of the carrier gas, and the flow of air about 5 to 10 times that of the hydrogen.

3. Determining the efficiency and the resolution
   (a) Carry out the analysis of a mixture of methyl stearate and oleate in about equivalent proportions (e.g., methyl esters from cocoa butter). Choose the size of the sample, the temperature of the column and the carrier gas flow so that the maximum of the methyl stearate peak is recorded about 15 minutes after the solvent peak and rises to three-quarters of the full scale. Calculate the number of theoretical plates n (efficiency) by the formula $$n = 16(dR_1/w_1)^2$$

and the resolution, R, by the formula $$R = 2\Delta/(w_1 + w_2)$$

where
dR1 is the retention distance, measured in mm, from the start to the maximum peak of methyl stearate.
w1 and w2 are the widths, in mm, of the peaks for methyl stearate and methyl oleate, measured between the points of intersection of the tangents at the inflection points of the curve with the base-line.
Δ is the distance between the respective peak maxima for methyl stearate and oleate.

(b) Operating conditions to be selected are those which will afford at least 2,000 theoretical plates for methyl stearate, and a resolution at least 1.25. Additionally, linolenic acid ($C_{18:3}$) ester should be separable from arachidic acid ($C_{20:0}$) and gadoleic acid ($C_{20:1}$) esters.
   (c) As a role, the operating conditions will be those defined above. Nevertheless, it is possible to work with a lower column temperature where the determination of acids below $C_{12}$ is required, or at a higher temperature when determining fatty acids above $C_{20}$.
   (d) On occasion, it is possible to employ temperature programming in both the previous cases. For example, if the sample contains the methyl esters of fatty acids below $C_{12}$, inject the sample at 100° C. column temperature and immediately raise the temperature at a rate of 4°–8° C./minute to the optimum. In some cases, the two procedures can be combined. After the programmed heating, continue the elution at a constant temperature until all the components have been eluted. If the instrument does not employ programmed heating, work at two fixed temperatures between 100° C. and 195° C. Liquid phase characteristics will determine the starting temperature or the upper temperature if the analysis is performed iso-thermally.

4. Analysis
 (a) The sample for examination should be 0.1–2 μL of the solution of methyl esters obtained according to AOCS Official Method Ce 2-66. In the case of esters not in solution, prepare an approximate 1–10% solution and inject 0.1–1 μL of this solution.
 (b) If the object is to determine constituents present only in trace amounts, the sample size may be increased (up to tenfold).

Calculations:
 1. Identification of Peaks
 (a) Analyze the reference standard mixture of known composition under the same operating conditions as those employed for the sample, and measure the retention distances (or retention times) for the constituent esters. Construct graphs showing the logarithm of the retention distance (or retention time) as a function of the number of carbon atoms of the acids; under isothermal conditions, the graphs for straight chain esters of the same degree of unsaturation should be straight lines. These straight lines are approximately parallel.
 (b) Identify the peaks for the sample from these graphs, by interpolation if necessary.
 (c) It is necessary to avoid conditions which permit masked peaks, i.e., where the resolution is not adequate to separate two components.

2. Quantitative Analysis
 (a) Apart from exceptional cases, assume that the whole of the components of the sample are represented on the chromatogram, so that the total of the areas under the peaks represents 100% of the constituents (total elution).
 (b) If the equipment includes an integrator, use the figures obtained therefrom. If not, determine the area under each peak by multiplying the height by the breadth at mid-height and, where necessary, take into account the various attenuations used during the recording.
 (c) For the general case, in which significant amounts of components below $C_{12}$ are absent, calculate the content of a particular constituent (expressed as percent of methyl esters) by determining the percentage represented by the area of the corresponding peak relative to the sum of the areas of all the peaks.

Area percent of the component i expressed as methyl ester =

$$\frac{A_i}{\Sigma A_i} \times 100$$

Where
 $A_i$ = area of the peak corresponding to component i.
 $\Sigma A_i$ = sum of the areas under all the peaks.
 (d) Correction factors, particularly in the presence of acids below $C_{12}$, of acids with secondary groups, or when using a TC detector, must be used to convert the percentages of peak areas into mass-percentages of the components. Determine the correction factors with the help of a chromatogram derived from the analysis of a reference mixture of methyl esters of known composition under operating conditions identical with those used for the sample.
For this reference mixture:

Weight percent (m/m) of component i =

$$\frac{B_i}{\Sigma B_i} \times 100$$

Where
 $B_i$ = mass of component i in the reference mixture
 $\Sigma B_i$ = total of the masses of the various components of the reference mixture From the chromatogram of the reference mixture, one can calculate:

$$\text{Area percent of component } i = \frac{C_i}{\Sigma C_i} \times 100$$

Where
 $C_i$ = area under the peak corresponding to component i.
 $\Sigma C_i$ = sum of the area under all the peaks.
Whence $$\text{Correction factor } K_i = \frac{B_i \times \Sigma C_i}{C_i \times \Sigma B_i}$$

Commonly, the correlation factors are made relative to $K_{C16}$ so the relative factors become:

$$K'_i = \frac{K_i}{K_{C16}}$$

Then the content of each component in the sample is given by:
Weight percent (m/m) of component i, expressed as methyl esters =

$$\frac{(K'_i \times A_i)}{\Sigma(K'_i \times A_i)} \times 100$$

(e) Use an internal standard, notably in determinations when all of the fatty acids are not eluted. The internal standard may be the methyl ester of the $C_{13}$ fatty acid. The correction factor for the internal standard should be determined:

Weight percent (m/m) of component i, expressed as methyl esters =

$$\frac{m_{C13} \times K'_i \times A_i}{m \times K'_{C13} \times A_{C13}} \times 100$$

Where
 $m_{C13}$ = mass, in mg, of the internal standard added to sample
 m = mass, in mg, of the sample
 *$K'_{C13}$ = correction factor for the internal standard relative to $K_{C16}$
 $A_{C13}$ = area of the peak corresponding to the internal standard
 $A_i$ = area of the peak corresponding to component i
 $K'_i$ = correction factor of component i relative to $K_{C16}$ $$*K'_{C13} = \frac{K_{C13}}{K_{C16}}$$

-continued

*Determined be adding a known amount $C_{13}$ methyl ester to the reference mixture and then following the above procedure for determining $K'_i$.

(f) Expression of the results—Give the results to: 3 significant figures for contents over 10%, 2 significant figures for contents between 1 and 10 percent, 1 significant figure for contents below 1 percent, i.e., with one figure beyond the decimal point in every case.

Precision:

1. Repeatability—The difference between the results of two determinations carried out on the same day by the same operator using the same apparatus for the same esters and for constituents present in excess of 5% should not exceed a relative figure of 3% of the determined value, with an absolute value of 1%. For components present in amounts of less than 5%, the repeatability in relative terms diminishes progressively as the content is reduced.

2. Reproducibility—The difference between the results obtained in two different laboratories for constituents present in excess of 5% should not exceed a relative figure of 10% of the determined value, with an absolute maximum of 3%. For constituents present in amounts less than 5%, the reproducibility in relative terms diminishes progressively as the content is reduced.

Notes:

1. If polyunsaturated components with more than three double bonds are present, they may decompose in a stainless-steel column.

2. It is recommended that chromatographers read "Standard Recommended Practice for General Gas Chromatography Procedures", ASTM Designation E260-73; "Standard Recommended Practice for Gas Chromatography Terms and Relationships", ASTM Designation E355-77; and "Standard Recommended Practice for Testing Flame Ionization Detectors Used in Gas Chromatography", ASTM Designation E594-77.

2. Ester Distribution of Sucrose Polyesters

The relative distribution of the individual octa-, hepta-, hexa- and penta-esters, as well as collectively the tetra- through mono-esters, of the sucrose polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e. an evaporative light-scattering detector). The detector response is measured and then normalized to 100%. The individual ester groups are expressed as a relative percentage.

3. Slope of Solid Fat Content (SFC) Profile of Nondigestible Fat Measured in °F.

Before determining the SFC values, a sample of the nondigestible fat is heated to a temperature of 140° F. (60° C.) or higher for at least 30 minutes or until the sample is completely melted. The melted sample is then tempered as follows: at 80° F. (26.7° C.) for 15 minutes; at 32° F. (0° C.) for 15 minutes; at 80° F. (26.7° C.) for 30 minutes; at 32° F. (0° C.) for 15 minutes. After tempering, the SFC values of the sample at temperatures of 50° F. (10° C.), 70° F. (21.1° C.), 80° F. (26.7° C.), 92° F. (33.3° C.), and 98.6° F. (37° C.) are determined by pulsed nuclear magnetic resonance (PNMR) after equilibration for 30 minutes at each temperature. The slope of the SFC profile in % solids/°F. is calculated by subtracting the SFC value at 70° F. (21.1° C.) from the SFC value at 98.6° F. (37° C.) and then dividing by 28.6. The method for determining SFC values by PNMR is as follows Apparatus:

1. Praxis Pulsed NMR SFC 900 Solid Fat Analyzer available from The Praxia Corporation, San Antonio, Tex., 78251, or equivalent.

2. Sample tubes. Test tubes, culture, disposable, Pyrex or Kimax glass, 10 mm OD×75 mm length without rims, with dimensions 0.380±0.005 inches OD (9.65±0.13 mm OD).

3. Oven maintained at 70° C.±2° C.

4. Corks, size 0.

5. Tissues for wiping sample tubes.

| Reagents: Olive oil reference liquids having the following compositional analysis (see Notes, 2) - | | |
|---|---|---|
| | Spanish | Italian |
| Iodine Value: | 84–87 | 85–88 |
| Saponification Value: | 189–195 | 192–195 |
| Fatty Acid Composition | | |
| $C_{16}$ | 9.5 ± 1.0 | 14.0 ± 1.5 |
| $C_{18}$ | 3.5 ± 0.5 | 2.5 ± 0.5 |
| $C_{18:1}$ | 76 ± 2.0 | 65.0 ± 3.0 |
| $C_{18:2}$ | 7.0 ± 1.5 | 14.0 ± 1.5 |
| $C_{18:3}$ | 1.0 ± 0.2 | 1.0 ± 0.2 |

Procedure:

1. Filling the sample tubes
   (a) Heat the sample in the 70° C. oven until liquid and mix well.
   (b) Fill the sample tube with the melted sample to approximately 15 mm from the top.
   (c) Place cork in top of sample tube.
   (d) Wipe sample tube with tissue making sure outside of tubes are clean.

2. Tempering of the sample and pulsed nmr measurements
   (a) Insert sample tubes containing all samples to be measured and the reference olive oil sample into the sample tempering ports of the 60° C. probe.
   (b) Equilibrate all samples and reference oil for 30 minutes.
   (c) Set the instrument conditions as follows

| | |
|---|---|
| Auto/Manual Switch | Auto |
| Probe/Selector | 6 |
| FID/Temp Switch | FID |
| Response | Fast |
| Variable Delay | 100 × 1 |
| Clock | 2 × 1.0 |
| Function | 90° C. |
| Program Counter | 8 |
| Gain and Instrument Background | Refer to Operators Manual |
| Probe Temperatures | Refer to Operators Manual |

(d) Insert the olive oil reference sample into the analysis port and measure the NMR reading (see Notes, 3).
   (e) Insert each sample into the analysis port and measure the NMR reading of each sample.
   (f) Transfer the reference oil and samples to the 26.7° C. probe and equilibrate for exactly 15 minutes.
   (g) Transfer the reference oil and samples to the 0° C. probe and equilibrate for exactly 15 minutes.

(h) Transfer the reference oil and samples to the 26.7° C. probe and temper for exactly 30 minutes.
(i) Transfer the reference oil and samples to the 0° C. probe and chill for exactly 15 minutes.
(j) Transfer the reference oil and samples to the 10° C. probe and equilibrate for exactly 30 minutes.
(k) Set clock to 1×1.0 an Probe Selector to 1.
(l) Measure the NMR reading of the reference oil and samples.
(m) Transfer the reference oil and samples to the 21.1° C. probe and equilibrate for exactly 30 minutes.
(n) Set Probe Selector to 2.
(o) Measure the NMR reading of the reference oil and the samples.
(p) Transfer the reference oil and samples to the 26.7° C. probe and equilibrate for exactly 30 minutes.
(q) Set Probe Selector to 3.
(r) Measure the NMR reading of the reference oil and the samples.
(s) Transfer the reference oil and samples to the 33.3° C. (or to 40.6° C.) probe and equilibrate for exactly 30 minutes.
(t) Set Probe Selector to 4.
(u) Measure the NMR reading of the reference oil and samples.
(v) Transfer the reference oil and samples to the 37.8° C. (or to 40.6° C.) probe and equilibrate for exactly 30 minutes.
(w) Set Probe Selector to 5.
(x) Measure the NMR reading of the reference oil and samples.

Calculations:

1. Solid Fat Content (SFC) at temperature $TC =$ $$\frac{\text{Reference oil at 60° C.}}{\text{Sample at 60° C.}} \times \frac{\text{Sample at } TC}{\text{Reference Oil } TC} \times 100$$

Example:

| NMR Readings: | |
|---|---|
| Reference Oil at 60° C. | 105.6 |
| Sample at 60° C. | 105.4 |
| Reference Oil at T° C. (10.0) | 98.8 |
| Sample at T° C. (10.0) | 80.2 |
| % Solid Fat = $100 - \frac{105.6}{105.4} \times \frac{80.2}{98.8} \times 100 = 18.67\%$ | |

Precision:

Data from the AOCS collaborative study which validated this method show the following reproducibility can be expected 1. Within and between laboratories, separate determinations of margarine-type oils should be plus or minus one standard deviation for temperatures listed:

| | 10.0° C. | 21.1° C. | 26.7° C. | 33.3° C. | 37.8° C. |
|---|---|---|---|---|---|
| Std. dev. | 0.6 | 0.5 | 0.6 | 0.6 | 0.4 |

2. Within and between laboratories, separate determinations of plasticized shortening-type oils should be plus or minus one standard deviation for temperatures listed:

| | 10.0° C. | 21.1° C. | 26.7° C. | 33.3° C. | 37.8° C. |
|---|---|---|---|---|---|
| Std. dev. | 0.7 | 0.7 | 0.6 | 0.5 | 0.4 |

3. Within and between laboratories, separate determination of non-cocoa butter-type confectionery fats should be plus or minus one standard deviation for temperatures listed:

| | 10.0° C. | 21.1° C. | 26.7° C. | 33.3° C. | 37.8° C. |
|---|---|---|---|---|---|
| Std. dev. | 0.6 | 1.0 | 1.1 | 0.5 | 0.4 |

4. Within and between laboratories, separate determinations for unhydrogenated palm-type oils should be plus or minus one standard deviation for temperatures listed (see Notes, 4):

| | 10.0° C. | 21.1° C. | 26.7° C. | 33.3° C. | 37.8° C. |
|---|---|---|---|---|---|
| Std. dev. | 1.0 | 0.8 | 0.6 | 0.5 | 0.4 |

5. Within and between laboratories, separate determinations tristearin in olive standards should be plus or minus one standard deviations at 10° C. for the percent tristearin in olive oils listed (see Notes, 5):

| | 10.0° C. | 21.1° C. | 26.7° C. | 33.3° C. | 37.8° C. |
|---|---|---|---|---|---|
| Std. dev. | 0.2 | 0.2 | 0.4 | 0.2 | 0.1 |

Notes:

1. The basic procedure described is applicable at temperatures and times other than those specified and the Committee recognizes that sometimes such deviations are necessary. In 1989, a collaborative study effort by the AOCS NMR Teclmical Committee was begun to establish harmonized tempering conditions for existing NMR instruments and for other types of fats and oils. The Committee expects this study to be completed in 1991.

2. The basic procedure described is dependent upon the chemical stability of the olive oil reference sample. Excessive heating or abuse can cause oxidation resulting in the formulation of solids and lower pulsed NMR readings. The Committee recommends replacement of the reference sample oil every three months with fresh olive oil which has been kept under refrigeration. While it is not the Committee's place or intent to recommend a specific oil, it is noted that the collaborative study was conducted using a high grade Lucca Olive Oil from Italy.

3. Push retest button one time before making NMR reading on first sample tested in each probe, as recommended by the Instrument Manufacturer.

4. The basic procedure described is applicable to unhydrogenated palm oils and blends containing unhydrogenated palm oils. The Committee recognized that other palm oil type samples and/or blends do produce poor reproducibility and further work is planned in this direction to establish tempering conditions prior to measurement.

5. These values of reproducibility are an indication of the precision obtainable by this method of measurement when polymorphic stability of the sample is not a factor. The tristearin in olive oil mixtures are also used as reference samples for the calibration of the instrument. These mixtures are melted and liquid readings taken at 70° C. before being tempered and measured by this method. The Solid Fat Content (SFC) values measured agree well with the percentage of solids by weight. A single fifth order polynomial regression equation is recommended for solids contents of 95% or less. Polynomial coefficients, correlation coefficients and interpolation tables for conversion of calculated solids to calibration corrected solids can be obtained from the manufacturer for each instrument.

The calibration procedure is also provided by the manufacturer.

4. Complete Melting Point of Polyol Polyesters by Differential Scanning Calorimetry (DSC)

The complete melting point of the polyol polyester material or polyol polyester-containing particles used in this invention can be determined by DSC as follows:

Equipment:
Perkin-Elmer 7 Series Thermal Analysis System, Model DSC7, manufactured by Perkin-Elmer, Norwalk, Conn.

Procedure:
1. Sample of polyol polyester material or polyol polyester-containing blend is heated to at least 10° C. above the temperature at which all visible solids are melted and mixed thoroughly.
2. 10±2 mg of sample is weighed into sample pan.
3. A scan is performed from about 10° C. above the temperature at which all visible solids are dissolved to −60° C. at 5° C. per minute.
4. The temperature of the sample is maintained at −60° C. for 3 minutes and scanned from −60° C. to the original starting temperature at 5° C. per minute (i.e., to about 10° C. above the temperature at which all visible solids are melted).
5. The complete melt point is the temperature at the intersection of the base line (i.e. specific heat line) with the line tangent to the trailing edge of the last (e.g., highest melting) endothermic peak.

5. Thixotropic Area Value

The nondigestible fat compositions of the present invention exhibit certain rheological characteristics (i.e. apparent viscosity and thixotropy) which correlate to the extent of passive oil loss control that such compositions provide. The method described herein is used to determine the Thixotropic Area of a fat composition wherein the solid component has crystallized via the cooling profile of the end-use product to form a three-dimensional, solid-like structure.

Thixotropic Area can be expressed in terms of the dimensions of energy per unit volume of sample being sheared, which is an indication that energy is required to break down the three-dimensional, solid-like structure of the material. (See Schram, G., *Introduction to Practical Viscometry*, pp. 17-19, Gebruder Haake, West Germany (1981).) Thus, Thixotropic Area may be considered a relative measurement of the three-dimensional, solid-like network of the fat composition that exists prior to shearing. In this method, shear stress is measured as a function of shear rate between $0 s^{-1}$ and $800 s^{-1}$ using a cone and plate rheometer. The shear rate is first increased for 7.5 minutes and then decreased for 7.5 minutes at 37.8° C. The Thixotropic Area is the area of the hysteresis between the ascending and descending flow curves. Nondigestible fat compositions which have Thixotropic Area Values of at least about 10 kPa/sec will exhibit passive oil loss control when ingested.

a) Calibration of Recorder

Figure 2:
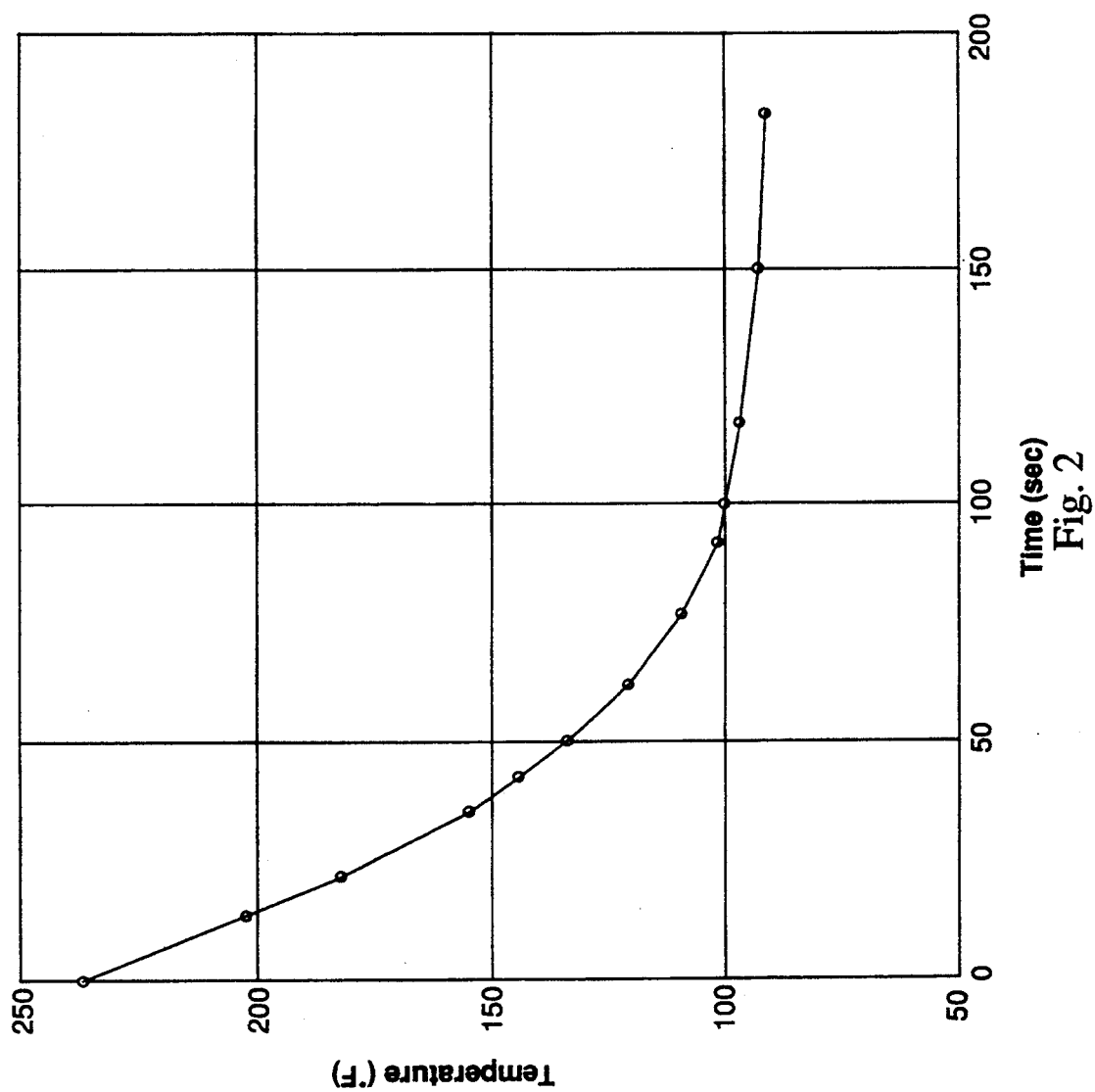
FIG. 2 is a template depicting the cooling profile of a potato chip.

A cooling profile template (see FIG. 2) is placed on an X-Y recorder (Houston Instruments Model 200) so that time is the X-axis. The cooling profile used should approximate that of the end-use product. In this case, the cooling profile used is an approximation of the cooling profile of a potato chip and is typical of all deep fat fried salted snack products. The recorder switches are set to the parameters described on the template and then calibrated in the following manner:

1. Calibrator set to 50 mv.
2. ZERO potentiometer adjusted until pen indicates 50° F. on recorder.
3. Calibrator is set to 190 mv.
4. SPAN potentiometer is adjusted until pen indicates 190° F. on recorder.

The above steps 1−4 are repeated until the pen indicates the proper temperature without adjustment. The strip chart recorder is then attached to the analog output of a thermocouple reader (Omega #199A).

b) Sample Preparation

A nondigestible fat sample is heated above the temperature at which all visible solids are dissolved until completely melted and then thoroughly mixed. Eight (8) grams of the sample are then weighed into an aluminum weighing pan (VWR Scientific #25433-008). A thermocouple (Omega #5TC-T-36-36 0.005 inch type T) is submerged in the sample in approximately the center of the pan, care being taken to keep the thermocouple tip from touching the bottom of the pan. The pan is then placed on a hot plate and heated to approximately 240° F. (240° F. is the estimated surface temperature of a potato chip after removal from the fryer. This temperature may have to be adjusted to approximate the cooling profile of the particular end-use product into which the fat composition being tested will eventually be incorporated.) When the appropriate temperature is reached, the recorder is started and the pan is removed from the hot plate and placed on top of a lab bench. The temperature of the sample is controlled so as to approximately track (±5°) the cooling curve shown on the template. This is achieved by providing gentle agitation to the pan to accelerate cooling and removing the pan from the lab bench top to slow the cooling rate. This cooling process takes approximately 3 minutes to complete, after which time the thermocouple is removed. The nondigestible fat sample is then tempered for at least 30 minutes at a temperature which is typical of the storage temperature encountered by the end-use product into which the nondigestible fat sample will eventually be incorporated (e.g., 70° F. for a potato chip) prior to measurement of the thixotropic area.

c) Rheometer Setup

The rheometer (Contraves Rheomat 115A with 2, 5 and 7 cm cones; 2° angle) is interfaced with a computer and set up under the following conditions:

| Program Setup | | |
|---|---|---|
| Sensitivity | 1.0 | |
| First minimum shear rate (s-1) | 0.000 | |
| Time at minimum shear rate (s) | 120.0 | Hold time to allow sample temperature equilibration |
| Ascending ramp time (s) | 450.0 | 7.5 minute scan 0 to 800 s-1 |
| Maximum shear rate (s-1) | 800.000 | |
| Hold time (s) | 1.0 | |
| Second minimum shear rate (s-1) | 0.000 | |
| Descending ramp time (s) | 450.0 | 7.5 minute scan 800 |

-continued

| | to 0 s-1 |
|---|---|
| Data Output Conditions | |
| Printout of measured points 1 to 15 | |
| Calculate Thixotropic Area | |
| Printout results | |

| # Samples | Feclone (g.) | 2% DL (g.) | Water (g.) | Total (g.) |
|---|---|---|---|---|
| 1 | 28.1 | 1.1 | 270.8 | 300 |
| 2 | 56.3 | 2.3 | 541.5 | 600.1 |
| 3 | 84.4 | 3.4 | 812.4 | 900.2 |
| 4 | 112.5 | 4.5 | 1083.0 | 1200 | d) Cone Selection

Using a CP-8 (2 cm) cone, measure the Thixotropic Area of the sample according to this method. If the Thixotropic Area Value is greater than 200 kPa/s, maximum accuracy has been attained. If the Thixotropic Area Value is between 50 and 200 kPa/s, the method should be repeated with a new sample using a CP-6 (5 cm) cone. If the Thixotropic Area Value is between 0 and 50 kPa/s, the method should be repeated using the CP-10 (7 cm) cone.

e) Torque Calibration

The rheometer is calibrated for torque by lifting the measuring head away from the plate and then adjusting the torque calibration knob on the control panel of the rheometer until the torque miter to the left of the adjustment knob reads "+000" with the "+" flashing.

f) Temperature Calibration

The temperature of the sample during analysis should be maintained at 37.8°±0.1° C. After setting the recirculating bath to achieve approximately 37.8° C., the plate temperature is checked by applying a small amount of oil to the plate, positioning the cone onto the plate, inserting a thermocouple probe into the gap between the cone and the plate, and then allowing a few minutes for the temperature to equilibrate. The temperature is then read with the bath temperature being adjusted until the plate temperature is 37.8°±0.1° C.

g) Sample Analysis

Approximately 4 grams of the tempered nondigestible fat sample is applied to the rheometer plate. The cone assembly is then lowered slowly onto the sample and seated firmly on the plate. At this point, the flow curve program is initiated. Upon completion of the run, a report is printed out listing the first 15 data points on the flow curve and the calculated thixotropic area. The Thixotropic Area is the hysteresis area between the ascending and descending flow curves and is reported as the Thixotropic Area Value (kPa/sec.).

6. Oil Separation Value

Oil separation of the nondigestible fat sample is measured by an in vitro method that simulates the motion and partial dehydration of a fat sample-containing simulated fecal matrix as it passes through the transverse colon. In such a method the extent of bulk oil separation for the sample-containing fecal matrix is measured. Oil separation of the nondigestible fat sample is determined by the following method wherein the fat sample has been cooled via the cooling profile of an end-use product prior to adding the simulated fecal material.

a) Preparation of Simulated Fecal Mixture

A suitable amount of Feclone solids (FPS-2 from Silicon Studios, Valley Forge, Pa.) determined as herein described is weighed into a stainless steel beaker. The particular amount of Feclone solids to be weighed out depends on the number of samples to be analyzed, as shown in the following table.

An excess of water is heated to boiling, and then the designated amount is weighed into a beaker containing the Feclone solids. This mixture is stirred during addition of the water to prevent lumping. The designated amount of 2% solution of DAWN dishwashing liquid (DL) (marketed by the Procter & Gamble Company) is added to the beaker and the entire mixture stirred until well blended over an approximately 3 minute time period. This mixture is then allowed to stand covered for 15–20 minutes, cooled to 100° F., and then stored in a 100° F. environment until used. The moisture content (i.e., water and dishwashing liquid) of the simulated fecal mixture at this point should be about 90.6% by weight of the mixture. This corresponds to the approximate moisture content of material entering the colon.

b) Simulation of Colonic Motility and Fecal Dehydration

A number of dialysis bags are prepared by cutting them in 16 inch lengths from a roll of dialysis tubing (Fisher #08-670E). One end of the tubing is left open while the other end is tightly twisted together approximately 1½ inches from its end to form a bag. This twisted end is secured with a wire twist tie approximately 12 inches long, the extra length to be used to anchor the bag on a roller apparatus described hereinafter in FIG. 3.

In a 100° F. environment, 276.7 grams of the simulated fecal mixture and 26 grams of the non-digestible fat sample are weighed into a model 400 Stomacher mixer bag (Fisher #14-550-5C) and then mixed for 30 seconds in a Stomacher Mixer (Fisher #14-550-2). This mixture is then poured into a tared dialysis bag and the actual weight of the mixture in the bag recorded. The other end of the dialysis bag is then twisted together after squeezing out the excess air and fastened with another wire twist-tie. A liquid nondigestible oil (e.g., liquid sucrose polyester) internal control is usually included as the nondigestible fat composition in one of the samples in each series of measurements.

Figure 3:
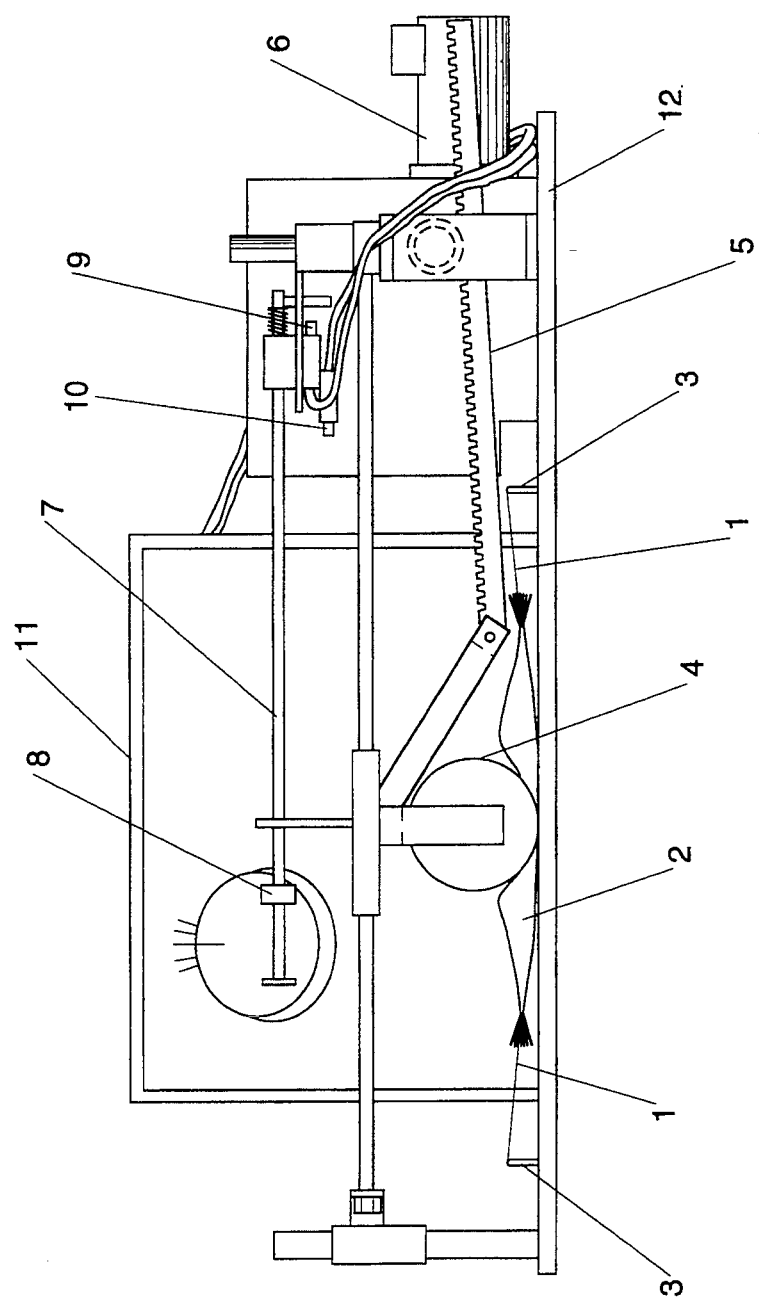
FIG. 3 is a depiction of the roller apparatus used in the Oil Separation Method hereinafter described in the Analytical Methods section.

The filled dialysis bags are then placed on the base plate (12) of a roller apparatus as described in FIG. 3. Wire twist ties (1) on each filled dialysis bag (2) are fastened onto anchor bars (3) located at each end of the roller apparatus to keep the bags in position. The clearance between the roller apparatus and the base plate is adjusted to approximately 3/16 inch. The roller apparatus consists of a stainless steel roller (4) attached to a gear-driven arm (5). The arm is connected to a variable speed motor (Dayton DC Gearmotor, Model 4Z137B, Gear Ratio 30:1, 8HP, 1.0 SF, F/L Torque 74 in/lb, RPM 60 at 9OVDC) (6) via a gear so that the roller can move along a guide bar (7) from one end of the dialysis bag to the other at a pre-set rate. A collar (8) located on the guide bar is adjusted so that the gear-driven arm will extend to a length such that the roller reaches all the way to the end of the dialysis bag. When the roller reaches this end of the bag, a limit switch (Omron, Model D616-01) (9) is triggered, causing the roller to change direction. When the roller reaches the other end of end of the dialysis bag, another limit switch (10) is triggered, causing the roller to again change directions. Thus, the roller continuously cycles from one end of the bag to the other. To most accurately simulate colonic motility, the motor should be set via a Controller (Boston Radiotrol DC Drive, Model RB3R) (11) such that the roller moves approximately 3 inches/minute.

The roller apparatus with the dialysis bags containing the simulated fecal mixture and the nondigestible fat sample is left in the 100° F. (37.8° C.) constant temperature room. Partial dehydration of the simulated fecal mixture occurs as moisture is evaporated through the dialysis tubing. The dehydration and rolling action are continued until the weight of the contents of the filled dialysis bags corresponds to approximately 75% moisture content (130±6 grams). It usually takes approximately 18–24 hours to reach this target weight. To determine whether the target moisture content of the fecal mixture has been achieved, the dialysis bags are removed from the roller apparatus and weighed. If the net weight of the contents of the bags are higher than the target weight hereinbefore calculated, then the moisture content is too high and the dehydration and rolling should be continued. If the net weight of the contents of the bags is less than the target weight, then the moisture content of the fecal mixture is too low and an excess of 100° F. water should be added and then the rolling and dehydration continued until the target weight is achieved.

c) Determination of Grams of Oil Separation (Oil Separation Value)

The filled dialysis bags are then cut open, and the contents transferred to a tared 150 ml centrifuge bottle with the aid of a rubber kitchen spatula and funnel. The weight of the material in the bottle is recorded, and then the bottle capped tightly. Each capped bottled is then put into a centrifuge (e.g., Damon/IEC Model UV, or equivalent) and spun for 30 minutes at 800 rpm and 100° F. Centrifuging separates the contents of the tube into a solids layer, a water layer and an oil layer. The distance (in centimeters) from the bottom of the oil layer to the top of the oil layer is measured. The grams of separated oil (OIL Separation Value) can be calculated using the following equation:

$$\text{Grams oil} = \pi r^2 (\rho) h$$

where
- $h$ = thickness of oil layer (cm)
- $\rho$ = density of oil layer (g/cm$^3$)
- $r$ = inside radius of bottle (cm)

In the case wherein a representative liquid sucrose polyester is used as the fat composition in a control sample, the Oil Separation Value is typically 19.1±1.2 grams.

7. Thickness of Solid Polyol Polyester Particles (Light Microscopy)

The thickness of the solid polyol polyester particles formed in the nondigestible fat compositions herein may estimated at room temperature with a Nikon Microphot video-enhanced light microscope (VELM) using Hoffman Modulation Contrast (HMC) optics according to the following method:

1. A small portion (i.e., 1–10 mg) of the nondigestible fat sample with the solid polyol polyester particles dispersed therein is placed on a microscope slide and covered. The slide is placed under the microscope.
2. The sample is examined using a HMC 100× oil objective as the standard lens in conjunction with a 10× eyepiece lens.
3. A microscope-mounted video camera and associated controller are used for video enhancement to facilitate differentiation between the sample and the background.
4. The thickness of the solid polyol polyester particles is measured in um.

This method permits differentiation of particles having thicknesses just within the resolution of the VELM (approximately 0.2–0.5 um). Particle thickness of particles having smaller dimensions can be determined by the Freeze Fracture Method described hereinafter.

(Note: No special sample preparation is required, other than obtaining a representative sample. The samples should be melted and cooled ambiently.)

Reference: Robert Hoffman, "The Modulation Contrast Microscope: Principles and Performances", *Journal of Microscopy*, Vol. 110, Pt 3, August 1977, pp. 205–222.

8. Thickness of Solid Polyol Polyester Particles (Freeze Fracture Transmission Electron Microscopy)

The three-dimensional topography of particles of polyol polyesters and their size can be determined by a freeze-fracture transmission electron microscopy (fftem) method.

This freeze-fracture method is carried out as follows:

1. The outside cavity of a freezing container is filled with liquid $N_2$ and the inner dewar of the freezing container is filled with liquid ethane (normal melting temperature of $-172°$ C.). The ethane is allowed to freeze.
2. A small amount (1–2 ul) of the nondigestible fat sample with the solid polyol polyester particles dispersed therein is placed in the well of a gold-plated Balzers specimen holder. (Note: for very fluid samples, 1–2 ul of sample is placed on a gold planchet (Baizers) and another planchet is placed on top of the first to form a sandwich.)
3. Most of the frozen ethane in the dewar is melted by inserting a metal heat sink into the dewar.
4. Immediately after melting the ethane, the specimen holder containing the nondigestible fat sample is picked up using a pair of tweezers and rapidly plunged into the liquid ethane.
5. After a few seconds, the specimen holder is removed from the ethane, quickly touched to the tip of a camel's hair brush to remove excess ethane, and immediately immersed in the liquid $N_2$ to keep the sample cold.
6. The sample is transferred under liquid $N_2$ to a JEOL JFD-9000C sample holder and then transferred into the chamber of a JEOL JFD-9000C freeze-fracture unit. The temperature of the unit should be about $-175°$ C. Vacuum should be at least $8 \times 10^{-7}$ torr.
7. A knife is cooled to a temperature of about $-165°$ C.
8. The sample is fractured in the JEOL chamber using the pre-cooled knife.
9. Platinum-carbon is deposited onto the fractured sample at a 45° angle for 4.5 seconds, followed by carbon deposition at a 90° angle for 25 seconds to form a replica of the fractured sample. The high voltage is 2500V and the current is 70 mA.
10. The samples are removed from the freeze fracture unit and cleaned using 3 washes of chloroform.

11. The replica is picked up on a 300 mesh copper EM grid and examined in a transmission electron microscope.
12. Images are recorded on negative film and positive prints are made from the negatives.
13. The thickness of the polyol polyester particles is measured in nm.

References:

Rash, J. E. and Hudson, C. S., *Freeze Fracture: Methods, Artifacts, and Interpretations*, New Haven Press, New York, 1979.

Stolinski and Breathnach, *Freeze Fracture Replication of Biological Tissues*, Academic Press, London, 1975.

Steinbrecht and Zierold, *Cryotechniques in Biological Electron Microscopy*, Springer-Verlag, Berlin, 1987.

9. Saponification Value

The solid polyol polyester sample can be saponified with refluxing alcoholic KOH according to the procedure described in *Official Methods and Recommended Practices of the American Oil Chemists Society*, 4th Ed., 1989, Procedure Cd 3-25. The resulting fatty acid soaps are titrated with standardized HCl to phenolphthalein endpoint. A blank (no sample added) is also run through the procedure and titrated.

The Saponification Value can be then calculated according to the following equation:

$$SV = ((B-S) \times N \times 56.1)/W$$

Where

B = volume (mls) HCl required to titrate the blank
S = volume (mls) HCl required to titrate the sample
N = normality of the HCl
W = sample weight in grams 10. Acid Value The solid polyol polyester sample can be titrated with standardized KOH to a phenolphthalein endpoint. The procedure is described in *Official Methods and Recommended practices of the American Oil Chemists Society*, 4th Ed., 1989, Procedure Cd 3a-63. A blank (no sample added) is titrated also.

The Acid Value can then be calculated according to the following equation:

$$AV = ((A-B) \times N \times 56.1)/W$$

where

A = volume in mls of KOH required to titrate the sample
B = volume in mls of the KOH required to titrate the blank
N = normality of the KOH
W = sample weight in grams 11. Hydroxyl Value The free hydroxyl groups of the sample can be quantitatively acetylated with acetic anhydride in pyridine. After acetylation, residual acetic anhydride is hydrolyzed with excess water and the acetic acid remaining is titrated with standardized ethanolic KOH to a phenolphthalein endpoint. A blank (no sample added) is run through the procedure and titrated also. The procedure is described in *Official Methods and Recommended Practices of the American Oil Chemists Society*, 4th Ed., 1989, Procedure Cd 13-60.

The hydroxyl value is then calculated according to the following equation:

$$HV = ((B-S) \times N \times 56.1)/W + AV$$

where

B = volume in mls of KOH required to titrate the blank
S = volume in mls of KOH required to titrate the sample
N = normality of the KOH
AV = acid value of the sample (described hereinabove)

12. Polymer Content of Polymer-Containing Solid Polyol Polyester Material

The relative amounts of monomer and total polymer material (e.g., sucrose polyester dimer, trimer, tetramer and higher) in the solid polyol polyester particle material can be determined using size exclusion chromatography. This method uses a Hewlett-Packard HP-1090 liquid chromatography system (LC) in combination with a Polymer Laboratories 60 cm×7.5 mm, 500A porosity 5 um column. The LC is set up to run under the following conditions:

| Injection Volume | 20 ul/min |
| --- | --- |
| Flow Rate | 1.0 ul/min |
| Mobile Phase | Filtered & Degassed tetrahydrofuran (THF) |
| Detector Attenuation | 32 X |
| Detector Temperature | 40° C. |
| Chart Speed | 5.0 mm/min |

A solid polyol polyester sample (0.75 grams) is dissolved in 25 cc of (THF), and then 20 microliters of this solution is injected into the LC system. The column separates the sample into monomer and polymer. The fractions are analyzed by a refractive index detector (Erma Optical Works ERC-7512). The detector response is then measured by an integrator. Relative peak areas eluting earlier than polyol polyester monomer are manually summed to report % polymer.

The various fractions (e.g., monomer, dimer, trimer, and tetramer and higher) are resolved into individual peaks on a strip chart. The monomer peak is identified by comparison with a previously run monomer standard. The elution order (increasing time) is tetramer and higher, trimer, dimer, and monomer. The instrument calculates the area under each peak. The weight percent of an individual polymeric species is the area under the species peak, divided by the sum of the areas under all the peaks.

13. Polyglycerol Ester Anallysis

A.) Average Degree of Glycerol Polymerization

The "average degree of glycerol polymerization" (n-bar) is a molar quantity which describes the the average number of glycerol moieties in the polyglycerol ester species comprising a polyglycerol ester mixture. The average degree of glycerol polymerization is calculated from an experimentally determined distribution of the weight percentages of the individual polyglycerol ester species which make up a given mixture of polyglycerol esters.

The distribution of polyglycerol ester species in a polyglycerol ester sample can be determined as follows: the polyglycerol ester sample is transesterified with sodium methoxide in refluxing methanol. The sodium methoxide is removed from the resulting solution by treatment with an anion exchange resin. The methanolic solution of polyglycerols and resulting methyl esters is extracted with hexane to remove the methyl esters.

Finally, the methanol is evaporated, leaving the mixture of unesterified polyglycerols. The polyglycerols thus obtained are derivatized with a 5/1 (by volume) mixture of trimethylsilyl imadazole and bis(trimethylsilyl)trifluoroacetamide in pyridine to form trimethylsilyl ethers. The sample is analyzed by GC using a short (18 inches by ⅛ inch ID), packed column (3% JXR on 100/120 mesh Gas Chrom Q), on column injection and flame ionization detection. The GC method is essentially that used for the separation of intact mixtures of mono-, di-, and triglycerides described in JAOCS, 58, (1981) pages 215–227.

The average degree of glycerol polymerization (n-bar) can then be calculated from the determined distribution of polyglycerol species in the sample according to the following equation:

$$\text{n-bar} = \frac{\sum_{n=1}^{\infty} n \times \frac{\text{Wt \% } G_n}{MW_{Gn}}}{\sum_{n=1}^{\infty} \frac{\text{Wt \% } G_n}{MW_{Gn}}}$$

where
Wt % $G_n$ = weight % in the sample of a polyglycerol species having n repeating units
$MW_{Gn}$ = the molecular weight of a polyglycerol species having n repeating units = n(74)+18

B) % Esterification of Polyglycerol Ester Mixture

The % esterification of a polyglycerol ester sample is the average degree of polyglycerol esterification expressed on a mole percent basis. The % esterification is calculated indirectly from the Saponification Value, the Acid Value and the average degree of glycerol polymerization of a polyglycerol ester sample. The analytical methods for determining the Saponification Value and the Acid Value of a polyglycerol ester sample are as hereinbefore described for determination of those values for polyol polyester materials in general.

From the Saponification Value and the Acid Value, the "Ester Value" (EV) of the polyglycerol ester sample can then be calculated. The Ester Value of a given polyglycerol ester sample is the difference between the saponification value (SV) and the acid value (AV) of the sample.

From the Ester Value, a Corrected Ester Value can then be calculated. The "Corrected Ester Value" ($EV_{cor}$) of a given polyglycerol ester sample is the calculated ester value of a pure sample containing only the polyglycerol esters (i.e., containing no free fatty acid). Corrected Ester Value is calculated according to the following equation:

$$EV_{cor} = \frac{EV}{1 - \frac{\% \, ffa}{100}}$$

where % ffa = AV(0.503)

Next, an average degree of esterification (i-bar) is calculated from the corrected ester value and the average molecular weight of the polyglycerol ($MW_{Gn}$-bar). The average degree of esterification (i-bar) is a molar quantity which describes the average number of the hydroxyl groups of the polyglycerol ester sample which are esterified with fatty acids. Thus, $$\text{i-bar} = \frac{(EV_{cor})(MW_{Gn\text{-}bar})}{56,100 - (EV_{cor})(\text{avg. } MW_{fa} - 18)}$$

where
$MW_{Gn\text{-}bar}$ = n-bar(74)+18
avg. $MW_{fa}$ = the average molecular weight of the fatty acid ester groups (fa) present in the polyglycerol ester sample calculated from the weight percent fatty acids of the various species as measured by the GCFAC method hereinbefore described according to the equation:

$$\text{avg. } MW_{fa} = \Sigma \, \frac{\text{wt \% } fa}{100} \, MW_{fa}$$

Lastly, the % esterification is calculated according to the following equation:

$$\% \text{ esterification} = \frac{(\text{i-bar}) \, 100}{\text{n-bar} + 2}$$

C) Digestibility of Fat Compositions (Lipase Test)

About 0.5 g of the nondigestible fat composition is melted and added to 25 ml of a Tris buffer solution (58.4 g NaCl (1.0M), 5.3 g $CaCl_2 \times 2H_2O$ (36 mM), 67.7 g Trizma (0.5M) deluted to 1 liter with with deionized water and adjusted to pH 8.0 with concentrated HCl) in a 125 ml Erlenmeyer flask. To this mixture is added 1.0 ml of a 1.0% sodium taurocholate solution (Sigma Chemical) and 0.5 ml of a 45.0% $CaCl_2 \times 2H_2O$ solution. About 5 glass beads are added, the flask stoppered and placed in water bath controlled at 37° C. equipped with wrist action shaker. The sample is shaken for 1 hour then 1ml of lipase solution (750 mg of lipase (Sigma Chemical type II, crude from porcine pancreas) diluted to 50 ml with the Tris buffer solution described above) is added. The mixture is shaken at 37° C. for one hour.

The reaction is terminated by the addition of 10 ml of concentrated HCl, 25 ml of deionized water and 10 ml of ethanol. The liberated free fatty acids are extracted with 3–100 ml portions of diethyl ether/petroleum ether (1:1 by volume). The combined extracts are washed with 3–100 ml portions of deionized water. The organic layer is dried with anhydrous sodium sulfate and filtered through Whatman #41 filter paper. The ether solvents are removed by rotary evaporation at 55° C.

The residue is washed into a 150 ml beaker with 2–30 ml portions of hot isopropyl alcohol/water (85/15 v/v). The mixture is titrated with standardized 0.1N NaOH solution to a phenolphthalein endpoint. A blank (no added test material) is run through the entire procedure and titrated also. The "Lipase Ester Value" (LEV) is calculated from the following equation:

$$LEV = (((s-B) \times N \times 56.1)/W) - AV$$

where
S = volume in mls of NaOH required to titrate the sample
B = volume in mls of NaOH required to titrate the blank
N = normality of the NaOH
W = sample weight on grams
AV = acid value of the sample (described hereinabove)

The percent hydrolysis is calculated from the following equation:

% Hydrolysis=(LEV)×100/(EV)

where
LEV=lipase ester value (hereinabove)
EV=ester value (described hereinabove)

Using these conditions and this enzyme preparation, only the esters of primary hydroxyl groups are hydrolyzed. For example, the LEV of pure triolian (triglyceride containing three oleic acid esters) is 126.9, the SV is 190.4 and the % hydrolysis is 66.7%. However, the triolian also contains hydroxyl groups other than primary hydroxyl groups which must be accounted for in determining digestibility of the triolian even though these other hydroxyl groups are not hydrolyzed under the conditions of this method. Therefore, it is assumed that triolian, a conventional triglyceride, is 100% digestible and the value of 66.7% hydrolysis obtained for the triolian sample according to this method is normalized to 100%. According to the definition of nondigestibility set forth hereinbefore in the Definitions section, only about 70% of the sample can be hydrolized versus a triglyceride by the enzymes in this lipase test. Therefore, for a fat composition to be considered nondigestible, the % hydrolysis value obtained for the sample according to this method should be 46.7% or less, preferably 13.3% or less, more preferably 6.7% or less.

G. Specific Examples

Preparation of the nondigestible fat compositions of the present invention is illustrated by the following examples. Examples I through IV illustrate the preparation of nondigestible fat compositions using several different types of solid polyester materials as oil loss control agents.

EXAMPLE I

Solid Sucrose Polyester (SPE) Preparation—Fatty-Fatty Acid-Containing SPE

The reaction apparatus used to prepare the solid sucrose polyester in this example is a one liter glass reaction flask fitted with a constant speed agitator, thermometer, McLeod gauge, and vacuum take-off. A heating mantle surrounds the reactor, and the temperature in the reactor is maintained by a Thermowatch. Vacuum is drawn on the reactor by a vacuum pump, and a dry ice trap is placed between the reactor vacuum take-off and the vacuum pump to condense and collect the methanol by product from the reaction.

About 61.8 grams of castor methyl esters are mixed with about 304.4 grams of hydrogenated-and-distilled rapeseed methyl esters. The molar ratio of caster methyl esters to hydrogenated and distilled rapeseed methyl esters is about 1.5/6.5. About 142.5 grams of this methyl ester mixture are added to a 1-liter spherical glass reactor along with about 34.4 grams of powdered sucrose, about 24 grams of powdered potassium stearate and about 1.4 grams of powdered potassium carbonate. The mixture is agitated and heated at about 135° C. at about 15 mm Hg vacuum for about 1.5 hours. After about 1.5 hours, the vacuum is broken with nitrogen, and the remaining 223.7 grams (approximately) of the methyl ester mixture, along with about 1.4 grams of potassium carbonate are added to the reaction mixture. This mixture is reacted at about 135° C. under about 0.5-5.8 mm Hg vacuum for about 5 hours. The mixture is cooled to about 75° C., and about 30 grams of water are added to the mixture. The mixture is transferred to jars and centrifuged (Fischer Scientific Model Marathon 10K Centrifuge) at about 2500 RPM for about 2 minutes. The liquid in the jars is then decanted from the soap layer at the bottom of the jars. About 5 grams of silica are added to the decanted liquid, and the mixture is stirred for about 30 minutes at about 75° C. The mixture is then filtered through filter paper using a Buchner funnel. The filtrate is then fed through a Pope 2-inch diameter wiped film evaporator at approximately 30 grams/hour to distill the unreacted methyl esters. The evaporator operates at about 235° C. under about 0.05-0.08 mm Hg. The product is then collected from the evaporator and cooled to ambient temperature.

The 12-hydroxy groups of the ricinoleic acids contained in the castor oil bound to the sucrose are themselves esterified with fatty acids during the reaction. This can verified by use of a multinuclear NMR experiment called Insensitive Nuclei Assigned by Polarization Transfer (INAPT). The procedure is described in Johnson, L. *Relaxation Times*, 7(1):4 (1990). The experiment detects long-range heteronuclear coupling, $^3J_{CH}$. The finished solid polyol polyester has an octaester content of 58.1%

Fat Composition Preparation

Four grams of this solid sucrose polyester and 96 grams of liquid sucrose polyester, in which the sucrose is substantially completely esterified with fatty acid groups of cottonseed oil, are mixed and heated until all of the solids are dissolved. The mixture is then cooled back to room temperature at a rate of 33.3° F./min. The cooling brings about crystallization of the solid sucrose polyester materials in the form of small, platelet-like particles which are dispersed in the liquid nondigestible oil. This composition bas a Thixotropic Area Value of 41.6 kPa/sec and an average Oil Separation Value of 16 grams. Thus, the composition does not produce passive oil loss which would otherwise result if only the liquid sucrose polyester is used as a food fat. This composition bas a Solid Fat Content profile slope of −0.1 solids/°F. As a result of this relatively flat SFC profile slope and the low solids levels used to prepare the fat composition, products made from this fat composition will not be waxy tasting.

The above liquid sucrose polyester is the same as that described in detail in Example II hereinafter.

EXAMPLE II

Solid Sucrose Polyester (SPE) Preparation -$C_{22}$/Toluic SPE Behenic Methyl Ester Preparation Behenic methyl esters are made from hydrogenated high erucic acid rapeseed oil. About 870 grams of hydrogenated high erucic acid rapeseed oil, about 174 grams of methanol, and about 12.2 grams of sodium methoxide solution (25% in methanol) are added to a spherical 3-liter glass reactor. The reactor has a heating mantle, thermometer, temperature controller, reflux condenser, variable speed agitator, vacuum take-off, and bottom outlet. The mixture is reacted at about 65° C. for approximately 1.5 hours, while refluxing the methanol. The agitation is stopped, and the glycerin by-product from the rapeseed oil is allowed to settle for about 30 minutes. The glycerin settles to the bottom of the reactor, and is removed through the bottom outlet. About 30 additional grams of methanol, and about 5.2 grams of sodium methoxide solution (25% in methanol) are added to the glass reactor, and the mixture is reacted at about 65° C. for about 30 minutes. The agitation is stopped, the glycerin is settled for about 30 minutes, and removed through the bottom outlet. About 100 grams of water are added to the mixture, stirred, allowed to settle, and removed through the bottom outlet. The water-washing procedure is repeated two more times. The reflux condenser is removed, and vacuum is broken, and a fractionation column is added to the reactor. The reactor is heated to about 170°–200° C. under a vacuum of about 0.3–1.0 mm Hg. Approximately 50% of the first material to evaporate from the column is collected and discarded. The next 40% (approximately) of the material to evaporate from the column is collected as product. This product is approximately 92% by weight methyl behenate and has the characteristics set forth in Table I hereinafter.

Sucrose Esterification

About 21.2 grams of methyl o-toluate (Aldrich Chemical Company) are mixed with about 366.2 grams of the behenic methyl esters. The molar ratio of toluic to behenic is about 1:7. About 152.6 grams of this methyl ester mixture are mixed in a 1-liter glass reactor along with about 34.4 grams of powdered sucrose, about 24 grams of powdered potassium stearate and about 1.4 grams of powdered potassium carbonate. The reactor has a heating mantle, thermometer, temperature controller, variable speed agitator, vacuum take-off, and bottom outlet. The mixture is agitated and heated at about 135° C. at about 15 mm Hg vacuum for about 1.5 hours. The vacuum is then broken with nitrogen, and the remaining 234.8 grams (approximately) of the methyl ester mixture, along with about 1.4 grams of potassium carbonate are added to the reaction mixture. This mixture is reacted at about 135° C. under about 0.5–5.8 mm Hg for about 5 hours. The mixture is cooled to about 75° C., and about 30 grams of water are added to the mixture. The mixture is transferred to jars and centrifuged (Fischer Scientific Model Marathon 10K Centrifuge) at about 2500 RPM for about 2 minutes. The liquid in the jars is then decanted from the soap layer at the bottom of the jars. About 5 grams of silica are added to the decanted liquid, and the mixture is stirred for about 30 minutes at about 75° C. The mixture is then filtered through filter paper using a Buchner funnel. The filtrate is then fed through a Pope 2-inch diameter wiped film evaporator at approximately 30 grams/hour to distill the unreacted methyl esters. The evaporator operates at about 235° C. under about 0.05–0.08 mm Hg. The product is then collected from the evaporator and cooled to ambient temperature.

This solid sucrose polyester product has a complete melting point of 70.5° C. (as measured by DSC described in the Analytical Methods section hereinafter) and is 99.0% esterified.

Preparation of Fat Composition

Figure 4:
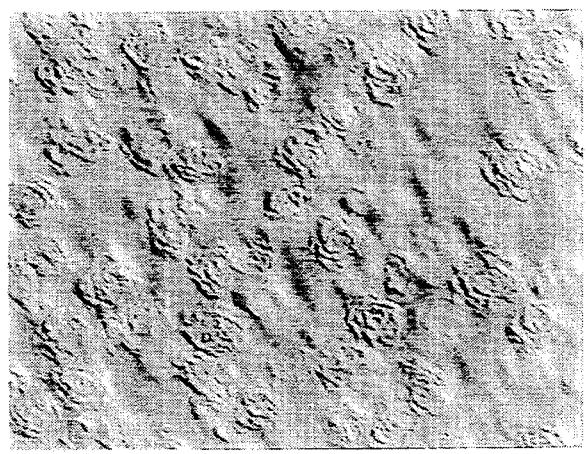
FIG. 4 is a photomicrograph (magnification 1000×) depicting particles of a diversely esterified solid sucrose polyester containing toluic acid as the dissimilar ester group, said solid sucrose polyester dispersed in a liquid sucrose polyester.

Six (6) grams of this solid sucrose polyester product and 94 grams of a liquid sucrose polyester, in which the sucrose is substantially completely esterified with fatty acid groups of cottonseed oil, are mixed and heated until all the solids are dissolved. The mixture is then allowed to cool back to room temperature at a rate of 33.3° F./min. The cooling brings about crystallization of the solid sucrose polyester material in the form of small, platelet-like particles which are dispersed in the liquid nondigestible oil. FIG. 4 is a photomicrograph depicting the two dimensional, platelet-like structure of the solid polyol polyester particles. These platelet-like particles have a thickness of less than about 100 nm as measured by Freeze Fracture Transmission Electron Microscopy described hereinafter in the Analytical Methods section.

The fat composition comprising the solid particles of sucrose polyester dispersed in the liquid sucrose polyester has an SFC profile slope of −0.1%solids/°F. and an average Oil Separation Value of 10 grams. The composition is suitable for use as a food fat, and does not produce passive oil loss which would otherwise result if only liquid sucrose polyester is used as a food fat. Also, since the level of solids in these fat compositions is so low, food products containing these fat compositions will not be waxy tasting.

The above sol id sucrose polyester and liquid sucrose polyester have the attributes shown in Table I:

TABLE I

|  | SOLID SUCROSE POLYESTER % | LIQUID SUCROSE POLYESTER % |
|---|---|---|
| FATTY ACID CONTENT |  |  |
| $C_{14}$ | — | 0.5 |
| $C_{16}$ | 0.1 | 20.3 |
| $C_{18}$ | 2.0 | 6.2 |
| $C_{18:1}$ | — | 37.3 |
| $C_{18:2}$ | 0.2 | 34.2 |
| $C_{18:3}$ | — | 0.3 |
| $C_{20}$ | 7.8 | 0.3 |
| $C_{22}$ | 88.4 | — |
| $C_{24}$ | 0.1 | — |
| Toluic | 1.4 | — |
| Other | — | 0.9 |
| ESTER DISTRIBUTION |  |  |
| Octa | 92.9 | 74.6 |
| Hepta | 6.7 | 25.0 |
| Hexa | 0.4 | <0.1 |
| Lower | — | <0.1 |

EXAMPLE III

Solid Sucrose Polyester (SPE) Preparation—Dimer Fatty Acid SPE

Solid sucrose polyester for use in a nondigestible fat composition is prepared by reacting sucrose with the methyl esters of both behenic acid and dimerized distilled tallow fatty acids.

Behenic methyl esters are prepared according to the description in Example II. About 100 grams of dimer fatty acids prepared from fractionated, distilled tallow fatty acids (Henkel 1008 dimer fatty acid) are added to a 1-liter glass reactor along with about 300 ml of Supelco BF3(boron trifluoride)/methanol solutions. The reactor is agitated with a paddle stirrer, has a heating mantle with temperature controller, a thermometer, an addition funnel, and a water-cooled reflux condenser. The temperature of the reactor is raised to about 65°–70° C., and kept there for about 2 hours. At the end of about 2 hours, an additional 100 ml of BF3/methanol is added to the mixture, dropwise, through the addition funnel over the course of about an hour. The mixture is transferred to a large separation funnel and the phases are allowed to separate. The methanol layer is removed, then about 50 grams of hexane is added to the mixture in the separation funnel and mixed thoroughly. This mixture is washed with about 50 grams of distilled water, the water layer is allowed to separate, and then removed. The water-washing procedure is repeated two more times. The mixture in the separatory funnel is transferred to a rotary evaporator, and the hexane is evaporated from the methyl esters. A base titration of the dried methyl esters is performed to ensure that the free fatty acid level is less than about 5%. The methyl esters are then run through a silica column to remove the remaining free fatty acid. The fractionated distilled tallow fatty acids from which the dimer fatty acids, and, subsequently, the dimer methyl esters, are prepared typically have the compositions set forth hereinafter in Table II.

Sucrose Esterification

The reactor used to prepare the sucrose polyester in this example is the same as that described in Example II hereinbefore. About 72.8 grams of the dimer methyl esters are mixed with about 306.3 grams of the behenic methyl esters. The molar ratio of dimer fatty acid:$C_{22}$ is about 1:7. About 189.5 grams of this methyl ester mixture are added to the reactor along with about 34.4 grams of powdered sucrose, about 24 grams of powdered potassium stearate and about 1.4 grams of powdered potassium carbonate. The mixture is agitated and heated at about 135° C. at about 15 mm Hg vacuum for about 1.5 hours. The vacuum is then broken with nitrogen, and the remaining 189.6 grams (approximately) of the methyl ester mixture, along with about 1.4 grams of potassium carbonate are added to the reaction mixture. This mixture is reacted at about 135° C. under about 0.5–5.1 mm Hg vacuum for about 5 hours. The mixture is cooled to about 75° C., and about 30 grams of water are added to the mixture. The mixture is transferred to jars and centrifuged (Fischer Scientific Model Marathon 10K Centrifuge) at about 10,000 RPM for about 2 minutes. The liquid in the jars is then decanted from the soap layer at the bottom. About 5 grams of silica are added to the decanted liquid, and the mixture is stirred for about 30 minutes at about 75° C. The mixture is then filtered through filter paper using a Buchner funnel. The filtrate is then fed through a Pope 2-inch diameter wiped film evaporator at approximately 30 grams/hour to distill the unreacted methyl esters. The evaporator operates at about 235° C. under about 0.04–0.05 mm Hg. The product is then collected from the evaporator and cooled to ambient temperature.

The resulting solid polyol polyester product is about 53.0% polymer and about 47% monomer. The polymer material comprises about 19.8% dimer, about 11.8% trimer and about 21.4% tetramer and higher. 16.8% of the product is octaester.

Fat Composition Preparation

Figure 5:
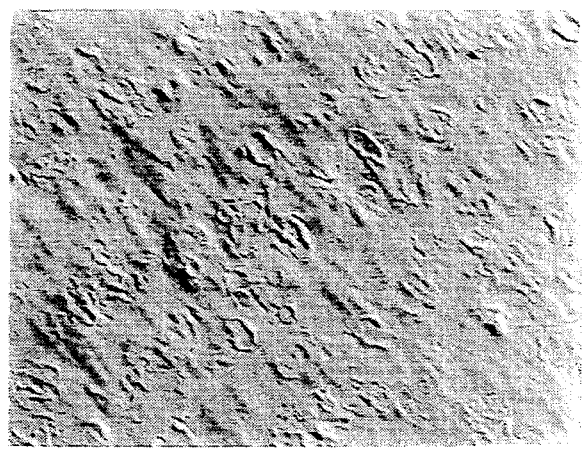
FIG. 5 is a photomicrograph (magnification 1000×) depicting particles of solid sucrose polyester polymer/monomer blends dispersed in liquid sucrose polyester.

Four grams of this solid polyol polyester product and 96 grams of liquid sucrose polyester, in which the sucrose is substantially completely esterified with fatty acid groups of cottonseed oil, are mixed and heated until all the solids are dissolved. The mixture is then cooled back to room temperature at a rate of 33.3° F./min. The cooling brings about crystallization of the solid sucrose polyester material in the form of small, platelet-like particles which are dispersed in the liquid nondigestible oil. FIG. 5 is a photomicrograph depicting the two-dimensional, platelet-like structure of the solid sucrose polyester particles dispersed in the liquid sucrose polyester material. The particles have a thickness of less than 25 nm as measured by Freeze Fracture TEM described hereinafter in the Analytical Methods section.

The nondigestible fat composition of this Example III comprising the solid particles of sucrose polyester dispersed in the liquid sucrose polyester has an SFC profile slope of −0.1, a Thixotropic Area Value of 52 kPa/sec, and an average Oil Separation Value of 10.5 grams, all determined by methods hereinbefore described in the Analytical Methods section. This Example III composition is suitable for use as a food fat, and does not present the passive oil loss problem which would otherwise result if only the liquid sucrose polyester were to be used as a food fat. Also, as a result of the low solids levels used to prepare the Example III fat composition, food products made from this fat composition are not unacceptably waxy tasting.

The liquid sucrose polyester, the solid polyol polyester and the starting materials for the solid sucrose polyesters have the compositions set forth in Table II.

TABLE II

| | BEHENIC METHYL ESTERS (%) | TALLOW | LIQUID POLYESTER |
|---|---|---|---|
| FATTY ACID CONTENT | | | |
| $C_{14}$ | — | 6.0 | 0.2 |
| $C_{16}$ | 0.88 | 11.0 | 17.0 |
| $C_{18}$ | 1.4 | <1.0 | 5.3 |
| $C_{18:1}$ | — | 73.0 | 36.8 |
| $C_{18:2}$ | — | 8.0 | 38.4 |
| $C_{18:3}$ | — | 1.0 | 0.4 |
| $C_{20}$ | 4.37 | — | — |
| $C_{22}$ | 91.66 | — | — |
| $C_{24}$ | 1.53 | — | — |
| Other | — | 1.0 | 0.1 |
| ESTER DISTRIBUTION | | | |
| % Octa | *** | *** | 78.8 |
| % Hepta | *** | *** | 20.8 |
| % Hexa | *** | *** | <0.1 |
| % Lower | *** | *** | 0.3 |

*** = not applicable

EXAMPLE IV

Solid Polyglycerol Ester (PGE) Preparation

A commercially available, narrow distribution (n-bar 3.19) PGE (Triodan 55, Lot #00202, Grinsted Denmark) is fractionated to remove most of the monoesters and some of the diesters leaving mostly di-, tri- and tetraesters with small amounts of penta- through heptaester. The starting polyglycerol ester has an i-bar of 1.30 and is 25% esterified.

The resulting solid polyglycerol ester has the following attributes:

| Saponification Value: | 159.4 |
|---|---|
| Acid Value: | 0.6 |
| Corrected Ester: | 159.3 |
| n-bar: | 3.54 |
| i-bar: | 2.83 |
| Melting Point: | 56.2° C. |
| Degree of Esterification: | 51.1% |
| $MW_{FA}$: | 271.2 |
| LEV: | 1.8 |
| Fatty Acid Composition: | % |
| $C_{12}$ | 0.1 |
| $C_{14}$ | 1.2 |
| $C_{15}$ | 0.1 |
| $C_{16:0}$ | 41.2 |
| $C_{16:1}$ | 0.2 |
| $C_{17}$ | 0.3 |
| $C_{18:0}$ | 55.6 |
| $C_{18:1}$ | 0.2 |
| $C_{18:2}$ | 0.2 |
| $C_{20}$ | 0.7 |

Fat Composition Preparation

Figure 6:
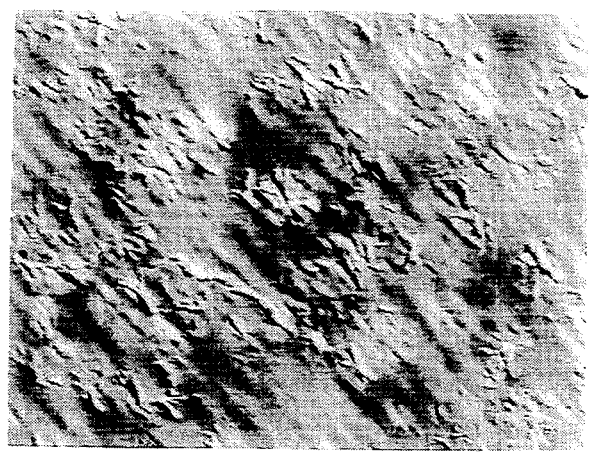
FIG. 6 is a photomicrograph (magnification 1000×) depicting particles of a solid polyglycerol ester dispersed in liquid sucrose polyester.
Figure 7A:
FIGS. 7a through 7d are photomicrographs (magnification 1000×) depicting particles of solid sucrose polyester hardstock dispersed in a liquid sucrose polyester at total solid levels of 1%, 3%, 6%, and 9%, respectively.
Figure 7B:
Figure 7C:
Figure 7D:
Figure 8:
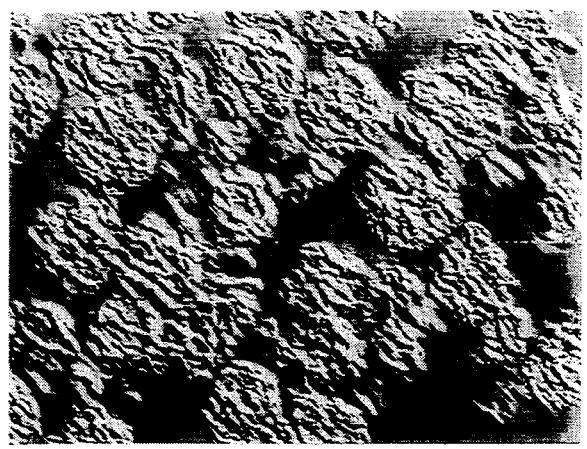
FIG. 8 is a photomicrograph (magnification 1000×) depicting a blend of solid sucrose polyester hardstock and solid sucrose polyester crystal modifier containing a mixture of sunflower and behenic fatty acids, the blend dispersed in a liquid sucrose polyester at a total solid level of 3%, where the ratio of hardstock to crystal modifier is 6:4.
Figure 9:
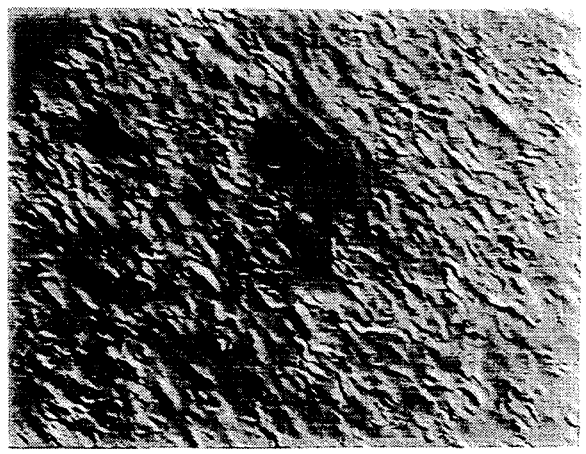
FIG. 9 is a photomicrograph (magnification 1000×) depicting a blend of solid sucrose polyester hardstock and solid sucrose polyester crystal modifier containing a mixture of lauric and behenic fatty acids in a molar ratio of 2:6, said blend dispersed in a liquid sucrose polyester at a total solids level of 3%, where the ratio of hardstock to crystal modifier is 6:4.
Figure 10:
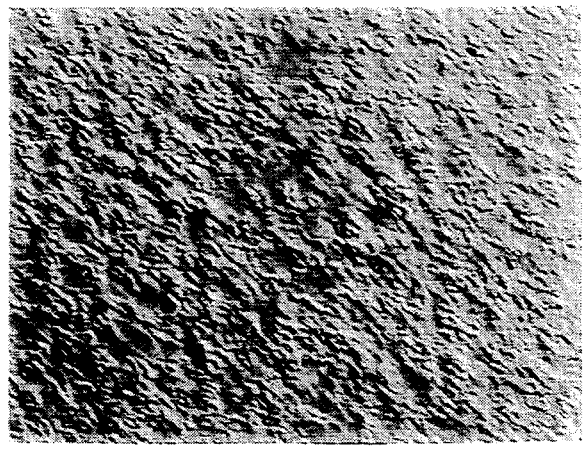
FIG. 10 is a photomicrograph (magnification 1000×) depicting a blend of solid sucrose polyester hardstock and a solid sucrose polyester crystal modifier containing a mixture of lauric and behenic fatty acids in a molar ratio of 1:7, said blend dispersed in a liquid sucrose polyester at a total solids level of 3%, where the ratio of hardstock to crystal modifier is 6:4.
Figure 11:
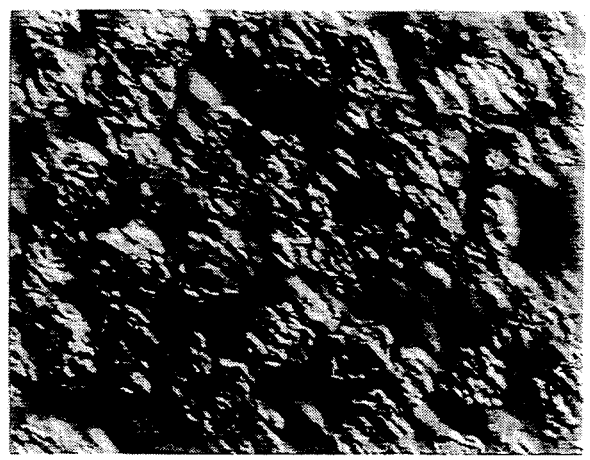
FIG. 11 is a photomicrograph (magnification 1000×) depicting a blend of solid sucrose polyester hardstock and solid sucrose polyester crystal modifier containing a mixture of toluic and behenic acids, said blend dispersed in a liquid sucrose polyester at a total solid level of 4%, where the ratio of hardstock to crystal modifier is 6:4.
Figure 12:
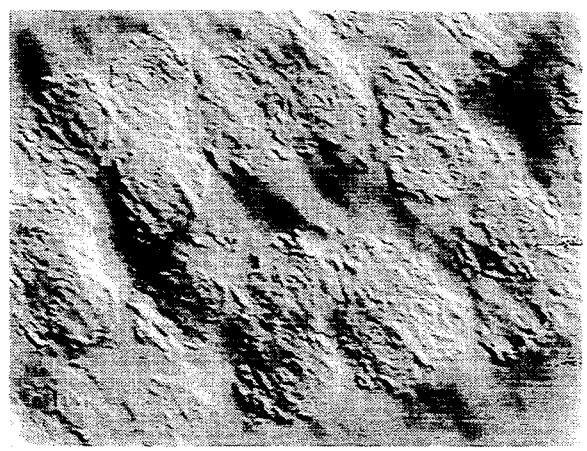
FIG. 12 is a photomicrograph (magnification 1000×) depicting a blend of solid sucrose polyester hardstock and and a solid sucrose polyester crystal modifier containing a mixture of dimerized oleic acid and behenic acid, said blend dispersed in a liquid sucrose polyester at a total solids level of 9%, where the ratio of hardstock to crystal modifier is 6:4.
Figure 13:
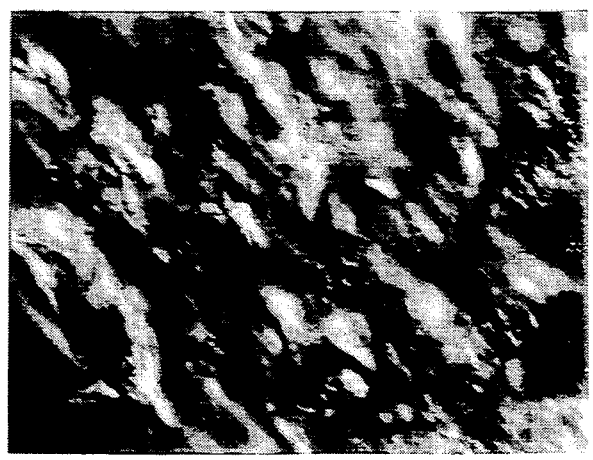
FIG. 13 is a photomicrograph (magnification 1000×) depicting a blend of a solid sucrose polyester hardstock and a solid polyglycerol ester dispersed in a liquid sucrose polyester at a total solid level of 9%, where the ratio of hardstock to polyglycerol ester is 6:4.
Figure 14:
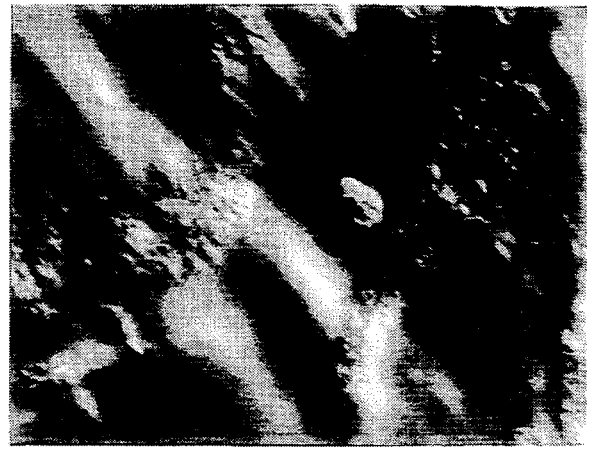
FIG. 14 is a photomicrograph (magnification 1000×) depicting a blend of solid sucrose polyester hardstock and monobehenin dispersed in a liquid sucrose polyester at a total solid level of 9%, where the ratio of hardstock to monobehenin is 6:4.
Figure 15:
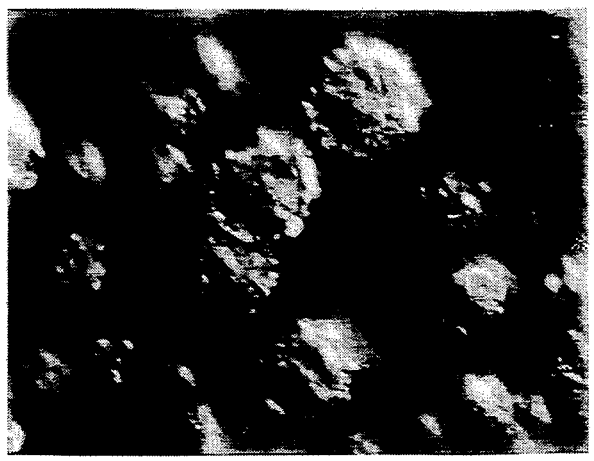
FIG. 15 is a photomicrograph (magnification 1000×) depicting a blend of solid sucrose polyester hardstock and beeswax dispersed in a liquid sucrose polyester at a total solids level of 9%, where the ratio of hardstock to beeswax is 6:4.

Six (6) grams of this solid polyglycerol ester product and 94 grams of the liquid sucrose polyester described in Example III are mixed and heated until all the solids are dissolved. The mixture is then allowed to cool back to room temperature at a rate of 33.3° F./min. The cooling brings about crystallization of the solid polyglycerol ester material in the form of small, two-dimensional particles which are dispersed in the liquid nondigestible oil. FIG. 6 is a photomicrograph depicting the two-dimensional structure of the sol id polyglycerol ester particles. These particles have a thickness of less than about 100 nm as measured by Freeze Fracture Transmission Electron Microscopy described hereinafter in the Analytical Methods section.

The fat composition comprising the solid particles of polyglycerol ester dispersed in the liquid sucrose polyester has a Thixotropic Area Value of 38.0 kPa/s and an average Oil Separation Value of 15 grams, and thus, does not produce passive oil loss which would otherwise result if only the liquid sucrose polyester is used as a food fat. The SFC profile slope of the fat composition is −0.1. As a result of this relatively flat SFC profile slope and the low solids level, food products containing this fat composition will not be waxy tasting.

Examples V through X illustrate the preparation of nondigestible fat compositions using a cocrystallized blend of sucrose polyester hardstock and a crystal modifier, which blend acts as an oil loss control agent. Example V illustrates preparation of the liquid nondigestible oil and solid hardstock components of such compositions. Examples VI through IX illustrate preparation of several different types of crystal modifier materials useful in forming such fat compositions. Example X illustrates the actual nondigestible fat compositions prepared by a combination of the Example V liquid and hardstock with the Example VI through IX crystal modifiers.

EXAMPLE V

Preparation of Liquid Nondigestible Oil and Hardstock Components

Both the liquid nondigestible oil and hardstock components of nondigestible fat compositions are prepared by essentially completely esterifying sucrose with fatty acids from naturally occurring source oils. For the liquid nondigestible oil component cottonseed oil is used. For the sucrose polyester hardstock, soybean oil, hydrogenated to an Iodine Value of about 8 or less, is used.

Both liquid and hardstock are prepared by converting the fatty acids from the source oils to their methyl esters and by then reacting these methyl esters with sucrose at about 135° C. in the presence of a potassium carbonate catalyst and the potassium soap of the source oil used. The procedure employed is substantially similar to that described in Example 1 of Volpenhein, U.S. Pat. No. 4,517,360; Issued May 14, 1985.

The resulting sucrose polyesters have the fatty acid composition and ester distribution as set forth in Table III.

TABLE III

|  | Liquid Sucrose Polyester | Solid Sucrose Polyester Hardstock |
|---|---|---|
| Fatty Acid Content (%) |  |  |
| $C_{14}$ | 0.5 | — |
| $C_{16}$ | 20.4 | 9.6 |
| $C_{18}$ | 4.3 | 87.3 |
| $C_{18:1}$ | 32.6 | 1.5 |
| $C_{18:2}$ | 40.9 | 0.4 |
| $C_{18:3}$ | 0.2 | — |
| $C_{20}$ | 0.4 |  |

TABLE III-continued

|  | Liquid Sucrose Polyester | Solid Sucrose Polyester Hardstock |
|---|---|---|
| Other | 0.7 | 0.5 |
| Ester Distribution |  |  |
| % Octa | 78.4 | 92.5 |
| % Hepta | 21.3 | 7.5 |
| % Hexa | <0.1 | <0.1 |
| % Penta | 0.3 | <0.1 |
| % Lower | <0.1 | — |

FIGS. 7a, 7b, 7c and 7d are photomicrographs showing a typical sucrose polyester hardstock of this type crystallized in a liquid nondigestible oil of the type described in this Example at levels of 1%, 3%, 6% and 9%, respectively.

EXAMPLE VI

Preparation of Diversely Esterified Sucrose Polyester (Sunflower/$C_{22}$) Crystal Modifier This example describes the preparation of a diversely esterified sucrose polyester crystal modifier of this invention by a modification of the process described in hereinbefore referenced U.S. Pat. Nos. 4,518,772 and 4,517,360.

High erucic acid rapeseed oil (HEAR) is blended with low erucic acid rapeseed oil (LEAR) to a composition of 38% erucic acid. The rapeseed oil blend is mixed with 3%–6% refined, bleached cottonseed oil to obtain an oil composition having approximately 35% of $C_{22}$ acids (i.e., behenic plus erucic). This rapeseed/cottonseed stock is then hydrogenated to an Iodine Value less than 4. Hydrogenation is done with nickel catalyst levels typical of those used for any vegetable oil, using 0–100 psig pressure, and a temperature of approximately 375° F. The material is deodorized at a temperature of 375°–495° F. The hardened, deodorized rapeseed oil has the following characteristics: fatty acid composition: 3–7% $C_{16:0}$, 45–55% $C_{18:0}$, 0–2% $C_{18:1}$, 0–1% $C_{18:2}$, 4–8% $C_{20:0}$, 33–37% $C_{22:0}$, 0–1% $C_{22:1}$, 0–2% $C_{24:0}$. Free fatty acid contents is 0.01–0.1% and Lovibond red color is about 1.0. The rapeseed/cottonseed oil is converted into methyl esters through an esterification process in which the oil is mixed with methanol, a sodium methoxide catalyst is added, and the reaction is continued until all the triglycerides are converted into methyl esters. By-product glycerine is settled by gravity after the reaction is completed. The esters are then water washed With hot water to remove trace levels of glycerine and soap. The water phase is settled out by gravity after each wash. The esters are flash distilled in a batch mode to both remove unsaponifiable materials and to obtain a more concentrated $C_{22}$ material. The distillation is done under a vacuum of 0.5–2 mm Hg and a temperature of 300°–410° F. The last 10%–15% of the esters distilled are collected into a clean vessel for use in making the desired sucrose polyester. The other 85–90% is discarded. The ester composition of the last 10–15% collected is: 4% $C_{18:0}$, 6% $C_{20:0}$, 87% $C_{22:0}$, 3% $C_{24:0}$. These are esters "A".

Refined and bleached sunflower oil is deodorized at a temperature of 375°–495° F. under vacuum. The deodorized sunflower oil has the following characteristics: Iodine Value: 125–140; fatty acid composition: 5–10% $C_{16:0}$, 2–6% $C_{18:0}$, 19–26% $C_{18:1}$, 63–74% $C_{18:2}$, 0–2% $C_{18:3}$, 0–1% $C_{20:0}$, 0–1% $C_{22:0}$. Free fatty acid content is 0.01–0.1% and Lovibond red color is about 1.3. The sunflower oil is converted into methyl esters through the same esterification process as described above. The esters are flash distilled in a batch mode, primarily to remove unsaponifiable materials. The distillation is done under a vacuum of 0.5–2.0 mm Hg and a temperature of 300°–410° F. These are esters "B".

About 70.5 Kg of methyl esters of refined soybean oil fatty acid, hardened to an IV of about 2, are mixed with 209 Kg of methanol and 15.4 Kg of potassium hydroxide in a stainless steel batch reactor. The mixture is heated to about 145° F. (63° C.) with agitation for 1 to 3 hours at atmospheric pressure. During this time, all but a residual amount of the methyl esters are saponified to make soap. About 1193.6 Kg of ester "A" is blended with 241.4 Kg of ester "B" to make ester blend "C". The ester composition of blend "C" is about: 1.2% $C_{16:0}$, 3.8% $C_{18:0}$, 3–8% $C_{18:1}$, 10.7% $C_{18:2}$, 4,7% $C_{20:0}$, 71.9% $C_{22:0}$, 3% $C_{24:0}$. About 545.5 Kg of ester "C" are added to the previously made soap mixture. About 104.5 Kg of granular sucrose is then added to give a 5:1 molar ratio of methyl ester to sucrose. Potassium carbonate is then added to the mixture (approx. 0.5 wt. percent of the reaction mix) to catalyze the transesterification. This mixture is agitated and slowly heated at atmospheric pressure until the temperature reaches about 275° F. (135° C.). This is to remove the methanol.

A vacuum is then pulled and the mixture agitated for up to 8 hours to form the mono-, di- and tri- sucrose esters. Small quantities of tetra- and pentaesters are also formed during this stage. Additional methyl ester "C" (890 Kg) which has been preheated to 275° F. (135° C.) is added to bring and maintain the molar ratio of the esters to sucrose to 14–15:1. Additional potassium carbonate is then added twice to the mixture (each addition being approximately 0.5 wt. percent of the initial reaction mix). When the reaction conditions stabilize at 275° F. (135° C.), a nitrogen sparge is used to improve agitation and promote methanol stripping. This second reaction stage lasts approximately 4 to 13 hours.

The reaction mixture is then cooled under nitrogen to between 149° F. (65° C.) and 185° F. (85° C.). The crude reaction mixture is agitated with about 91 Kg water. The hydrated crude reaction mixture is passed through a centrifuge to separate a heavy and a light phase. The heavy phase which contains the soaps, excess sugars and potassium carbonate is discarded. The light phase is then washed with an additional 264 Kg of water. The light phase, which contains methyl esters and the sucrose polyester is then dried to remove moisture at 170°–190° F. (76°–88° C.) under 70 mm Hg or less vacuum for 30 to 60 minutes. Filtrol 105 (1.0 wt. percent) is added and the mix is agitated at 167° F. (75° C.) to 190° F. (88° C.). The slurry is separated by filtration or other means until there is less than 0.1 wt. percent fines. The liquid is then passed through a 1 micromillimeter filter.

The refined and bleached reaction mix is then passed through a stainless steel wiped-film evaporator or other suitable equipment to distill off the bulk of the methyl esters. The distillation takes place at 392° F. (200° C.) to 455° F. (235° C.) under approximately 0.5 mm Hg of vacuum. The sucrose polyester is then deodorized by passing downward through a stainless steel packed column deodorizer or other suitable device at 392° F. (200° C.) to 450° F. (232° C.) under a vacuum of about <25 mm Hg. Steam is introduced to the bottom of the column and passes countercurrently to the sucrose polyester. Feed rates and temperature are adjusted until the methyl ester content of the sucrose polyester is below 1000 ppm. The mixture is then cooled to between 149° F. (65° C.) to 185° F. (85° C.) and passed through a 1 micromillimeter filter. Sucrose polyester made according to the foregoing procedure has the approximate composition and properties as set forth in Table IV.

TABLE IV

| Fatty Acid Composition | |
|---|---|
| $C_{16}$ | 1.2% |
| $C_{17}$ | 0 |
| $C_{16:1}$ | 0 |
| $C_{18}$ | 4.6 |
| $C_{18:1}$ | 3.7 |
| $C_{18:2}$ | 10.9 |
| $C_{18:3}$ | 0 |
| $C_{20}$ | 4.6 |
| $C_{20:1}$ | 0 |
| $C_{22}$ | 71.7 |
| $C_{22:1}$ | 0.2 |
| $C_{24}$ | 2.8 |
| Other | 0.4 |
| Iodine Value | 22.4 |
| Complete Melting Point (By Differential Scanning Calorimetry) | 70.4° C. |
| Ester Distribution | |
| Octa | 71.6% |
| Hepta | 28.2 |
| Hexa | 0.2 |
| Penta | <0.1 |
| Lower | <0.1 |

EXAMPLE VII

Preparation of Diversely Esterified Sucrose Polyester (2-$C_{12}$, 6-$C_{22}$) Crystal Modifier This example describes preparation of another type of diversely esterified sucrose polyester via an acid chloride synthesis route.

About 16 grams (0.047M) of sucrose (Colonial Baker's Special) is dissolved in 340 ml pyridine and 110 ml DMF at 50° C. for 1 hour. This solution is allowed to cool back to room temperature before addition of the acid chloride.

A blend of 20.4 grams (0.09M) of $C_{12}$ acid chloride in 55 ml n-heptane is prepared and charged into an addition funnel. This solution is slowly added to the stirring sucrose solution. With addition complete, the entire contents of the reactor are heated to 65° C. and held for ∼6 hours. Heat is stopped after that time and agitation of the reaction mix is allowed to continue overnight at room temperature.

Thereafter, a blend of 102.0 grams (0.28M) of $C_{22}$ acid chloride in 100 ml n-heptane is prepared and slowly added to the reaction mix through the addition funnel. When addition is complete the reactor is again heated to 65° C. and held for ∼5 hours. At the end of that time the heating source is stopped and agitation is allowed to continue overnight at room temperature.

Thereafter the reaction mix is again heated to 65° C. for 2 hours, then allowed to cool at room temperature. A blend of 2.0 grams (0.009M) of $C_{12}$ acid chloride, 10.0 grams (0.028M) of $C_{22}$ acid chloride in 50 ml of n-heptane is prepared and slowly added to the reaction mix when it reaches room temperature. This is allowed to run at room temperature overnight.

Thereafter a small sample (∼3 ml) is pulled from the reactor and checked by Thin Layer Chromatography to determine reaction completeness. When complete, a cleanup sequence is started.

Cleanup

The entire contents of the reactor are transferred to a rotovap at which point the solvent is stripped leaving the crude reaction mix. 500 ml of methylene chloride is added to the evaporated crude and transferred to a large separatory funnel.

This is then washed:
3 times with 1000 ml of a warm saturated NaCl/H$_2$O solution.
1 time with a 10% v:v warm HCl:H$_2$O solution.
2 times with 1000 ml of a warm saturated NaCl/H$_2$O solution.
1 time with 1000 ml of a warm Ca(OH)$_2$/H$_2$O solution having a pH of 13. Both the aqueous and solvent phase are passed through a Celite bed under vacuum.

The recovered solvent phase is washed 2 times with 1000 ml of warm saturated NaCl/H$_2$O solution.

The solvent phase is then transferred to a clean Erlenmeyer flask equipped with a magnetic stir bar. With agitation, magnesium sulfate and florisil are added to chemically dry and decolorize the material over a period of ~4 hours.

The magnesium sulfate/florisil are separated from the solvent phase by filtration. The solvent phase is then extracted two times with 500 ml of hot MeOH. Final traces of MeOH are evaporated from the solvent/product phase on the rotovap.

One-half of the product obtained (50.5 grams) is taken up in 100 ml ethyl acetate. At the same time 1000 ml of MeOH is charged into a large Erlenmeyer flask equipped with a magnetic stir bar. The ethyl acetate/product solution is slowly poured into the stirring MeOH. Crystals form immediately and the entire solution is allowed to stir for 2 hours.

The product crystals are filtered away from the mother liquor using a vacuum equipped Buchner funnel. During this step the crystals are rinsed with MeOH.

The crystals are transferred to a glass drying dish and allowed to air dry (remove MeOH) overnight.

Analytical results are obtained for this product are set forth in Table V.

TABLE V

| Fatty Acid Composition % | |
|---|---|
| $C_{10}$ | 0.1 |
| $C_{12}$ | 10.5 |
| $C_{14}$ | 0.4 |
| $C_{16}$ | 0.1 |
| $C_{18}$ | 1.1 |
| $C_{18:1}$ | 0.1 |
| $C_{20}$ | 3.0 |
| $C_{22}$ | 82.0 |
| $C_{22:1}$ | 0.4 |
| $C_{24}$ | 2.1 |
| Iodine Value = 0.5 | |
| % Octa by HPLC = 87.0% | |

EXAMPLE IX

Preparation Of Diversely Esterified Sucrose Polyester (1-$C_{16}$, 7-$C_{22}$) Crystal Modifier This example demonstrates preparation of another type of diversely esterified sucrose polyester via an acid chloride synthesis route:

| Raw Materials: | |
|---|---|
| Sucrose | Colonial Bakers Special |
| $C_{12}$ acid chloride | Prepared from pure $C_{12}$ fatty acid |
| $C_{22}$ acid chloride | Prepared from behenic acid |
| heptane | Fisher brand |

Preparation Procedure 1. 30 gms sucrose are dissolved into a mixture of 100 ml pyridine and 120 ml DMF. The solution is transferred into a reaction flask.
2. 21.0 gm $C_{12}$ acid chloride are then diluted into 50 ml heptane.
3. The apparatus is assembled with heating mantle, overhead stirrer, mercury thermometer, cold water condenser (CaSO$_4$ tube), N$_2$ inlet and addition funnel.
4. The $C_{12}$ acid chloride solution is transferred into the addition funnel and is then slowly added to the sucrose solution. The reaction is allowed to proceed ~1 hour.
5. 241.7 gm $C_{22}$ acid chloride are then diluted into 200 ml heptane. This solution is transferred into the addition funnel and is slowly added to the reaction flask.
6. The contents of the flask are then heated to ~90° C., and the reaction is allowed to continue ~3 hours (cooled to room temperature overnight).
7. The reaction is continued at 70° C. for ~10 hours.
8. The crude reaction mixture is then subjected to cleanup procedures substantially similar to those described hereinbefore in Example VIII. The crystals recovered are analyzed with the analytical results set forth in Table VI.

TABLE VI

| Fatty Acid Composition % | |
|---|---|
| $C_{12}$ | 7.81 |
| $C_{16}$ | 0.23 |
| $C_{18}$ | 1.47 |
| $C_{18:1}$ | 0.08 |
| $C_{18:2}$ | 0.15 |
| $C_{20}$ | 4.30 |
| $C_{22}$ | 82.87 |
| $C_{24}$ | 0.94 |
| Other | 2.16 |
| % Octa ester = 87.5 | |

EXAMPLE X

A number of nondigestible fat compositions are prepared by combining the liquid nondigestible oil and sucrose polyester hardstock as described in Example V with the several crystal modifier species described in Example VI through Example IX. The solid sucrose polyesters described in Examples I through IV may also be used as the crystal modifier. To prepare such compositions, the liquid sucrose polyester, the sucrose polyester hardstock and the crystal modifier material are mixed and heated until all the solids in the mixture are dissolved. The mixture is then cooled back to room temperature at a rate of 37.3° F./min. Such cooling brings about crystallization of solid sucrose polyester material in the form of small platelet-like particles which are dispersed in the liquid nondigestible oil. Table VII describes the characteristics of each such composition in greater detail. Table VII also identifies the Figure in the set of photomicrographs which represents each such composition.

TABLE VIII

| Composition Number | Liquid Oil | Sucrose Polyester Hardstock | Crystal Modifier | Hardstock/ Modifier Ratio | % Solids in Composition | Average Particle Thickness | SFC Profile Slope | Photo-Micro-FIG. No. |
|---|---|---|---|---|---|---|---|---|
| A | $C_{16}/C_{10}$ sucrose octaester Ex. I | $C_{18}$ sucrose octaester Ex. I | Sunflower/$C_{22}$-Ex. II | 6:4 | 3 | ≦50 mm | NA | 3 |
| B | $C_{16}/C_{10}$ sucrose octaester Ex. I | $C_{18}$ sucrose octaester Ex. I | 2-$C_{12}$/6-$C_{22}$-Ex. III | " | 3 | ≦50 mm | NA | 4 |
| C | $C_{16}/C_{10}$ sucrose octaester Ex. I | $C_{18}$ sucrose octaester Ex. I | 1-$C_{12}$/7-$C_{22}$-Ex. IV | " | 3 | ≦50 mm | NA | 5 |
| D | $C_{16}/C_{10}$ sucrose octaester Ex. I | $C_{18}$ sucrose octaester Ex. I | $C_{22}$/Toluic-Ex. V | " | 9 | NA | 0 | 6 |
| E | $C_{16}/C_{10}$ sucrose octaester Ex. I | $C_{18}$ sucrose octaester Ex. I | $C_{22}$/Dimer-Ex. V | " | 9 | NA | 0 | 7 |
| F | $C_{16}/C_{10}$ sucrose octaester Ex. I | $C_{18}$ sucrose octaester Ex. I | PGE-EX. VI | " | 9 | NA | −0.1 | 8 |
| G | $C_{16}/C_{10}$ sucrose octaester Ex. I | $C_{18}$ sucrose octaester Ex. I | Monbehenin[A] | " | 9 | NA | −0.1 | 9 |
| H | $C_{16}/C_{10}$ sucrose octaester Ex. I | $C_{18}$ sucrose octaester Ex. I | Beeswax[B] | " | 9 | NA | −0.1 | 10 |

(A) — Monobehenin is obtained from Grinsted (Lot #TSR D31).
(B) — Beeswax is obtained from Aldrich #24, 322-1 (bleached white).

What is claimed is:

1. A nondigestible fat composition useful as a replacement for triglyceride fats or oils in foods, which composition has a Solid Fat Content profile slope between 70° F. and 98.6° F. of from 0 to about −0.75% solids/°F. and which comprises:
   A. a liquid nondigestible oil having a complete melting point below about 37° C.; and
   B. nondigestible solid particles having a complete melting point above about 37° C. but below about 500° C. dispersed in said oil in an amount sufficient to control passive oil loss upon the ingestion of said composition; said nondigestible particles not consisting solely of polyol polyesters wherein the polyol moiety of said polyol polyesters has at least 4 hydroxyl groups, at least 4 of which hydroxyl groups are esterified, and wherein the ester groups in said polyol polyesters are comprised of a combination of:
      (i) $C_{12}$ or higher unsaturated fatty acid radicals, $C_2$–$C_{12}$ saturated fatty acid radicals or mixtures thereof, and
      (ii) $C_{20}$ or higher saturated fatty acid radicals, wherein the molar ratio of (i) to (ii) radicals in said combination ranges from about 1:15 to about 2:1 and wherein at least 15% by weight of the fatty acid radicals forming said combination are $C_{20}$ and higher saturated fatty acid radicals; and wherein the liquid nondigestible oil and the nondigestible solid particles are co-crystallized in a manner such that the nondigestible solid forms dispersed platelet-like particles having a thickness of 1 micron or less in the liquid nondigestible oil.

2. A nondigestible fat composition according to claim 1 which comprises from about 60% to about 99% liquid nondigestible oil and from about 1% to about 40% of the nondigestible solid particles dispersed in said oil.

3. A nondigestible fat composition according to claim 2 wherein the nondigestible particles have a thickness of about 0.1 micron or less.

4. A nondigestible fat composition according to claim 3 wherein the liquid nondigestible oil is a liquid sucrose fatty acid polyester.

5. A nondigestible fat composition according to claim 4 wherein the nondigestible solid particles comprise material selected from A) diversely esterified polyol polyesters wherein at least 15% of the ester groups therein are formed from $C_{20}$–$C_{26}$ saturated fatty acid radicals;

B) polyol polyester materials comprising from about 1% to 100% of a polyol polyester polymer component wherein at least 15% of the hydroxyl groups of said polyol polyester material are esterified with $C_{20}$–$C_{26}$ saturated fatty acid radicals;

C) polyglycerol esters containing at least 2 glycerol moieties and having at least 30% of the hydroxyl groups of said glycerol moieties esterified with $C_{16}$–$C_{26}$ fatty acid radicals; and D) cocrystallized blends of:
   (i) a nondigestible solid polyol fatty acid polyester hardstock having a complete melting point above about 37° C. and normally tending to form spherulitic particles having a diameter of about 3 microns or larger when crystallized in the liquid sucrose fatty acid polyester; and
   (ii) a crystal modifier capable of inducing said hardstock to form nondigestible particles having a thickness of 1 micron or less when cocrystallized with hardstock in the liquid sucrose fatty acid polyester; the ratio of said hardstock to said crystal modifier in cocrystallized blend ranging from about 95:5 to about 20:80.

6. A nondigestible fat composition according to claim 5 wherein the nondigestible particles comprise a cocrystallized blend of sucrose fatty acid polyester hardstock and a crystal modifier which is selected from A) diversely esterified polyol polyesters wherein at least 15% of the ester groups therein are formed from $C_{20}$–$C_{26}$ saturated fatty acid radicals;

B) polyol polyester materials comprising from about 1% to 100% of a polyol polyester polymer component wherein at least 15% of the hydroxyl groups of said polyol polyester material are esterified with $C_{20}$ or higher saturated fatty acid radicals;

C) polyglycerol esters containing at least 2 glycerol moieties and having at least 30% of the hydroxyl groups of said glycerol moieties esterified with $C_{18}$ or higher fatty acid radicals;

D) naturally occurring waxes or paraffinic hydrocarbon microcrystal line waxes;

E) monoglycerides containing one ester group derived from $C_{18}$ or higher fatty acid radicals; and F) long chain alcohols.

7. A nondigestible fat composition according to claim 6 having a Solid Fat Content profile slope between 70° F. and 98.6° F. of from 0 to about −0.5%solids/°F. and an Oil Separation Value of about 16 grams or less.

8. A nondigestible fat composition according to claim 7 which has a Thixotropic Area Value of about 10 kPa/sec. or greater.

9. A nodigstible fat composition useful as a replacement for triglyceride fats or oils in foods, which fat composition has a Solid Fat Content profile slope between 70° F. and 98.6° F. of from 0 to about −0.75% solids/°F. and which fat composition comprises.

A. a liquid nondigestible oil having a complete melting point below about 37° C.; and B. nondigestible solid parities dispersed in said oil in an amount sufficient to control passive oil loss upon ingestion of said composition, said particles having a complete melting point above about 37° C. but below about 500° C., with said particles further serving to impart to said composition an Oil Separation Value of about 16 grams or less; and wherein the liquid nondigestible oil and the nondigestible solid particles are co-crystallized in a manner such that the nondigestible solids forms dispersed platelet-like particles having a thickness of 1 micron or less in the liquid nondigestible oil; said particles furthermore not consisting solely of polyol polyesters wherein the polyol component of said polyol polyesters has at least 4 hydroxyl groups at least 4 of which hydroxyl groups are esterified, and wherein the ester groups in said polyol polyesters comprised of a combination of:

(i) $C_{12}$ or higher unsaturated fatty acid radicals, $C_2$–$C_{12}$ saturated fatty acid radicals or minutes thereof, and (ii) $C_{20}$ and higher saturated fatty acid radicals; wherein the molar ratio of the (i) to (ii) radicals in said combination ranges from about 1:15 to about 2:1 and wherein at least 15% by weight of the fatty acid radicals forming said combination are $C_{20}$ and higher saturated fatty acid radicals 10. A nondigestible fat composition according to claim 9 wherein the nondigestible particles have a thickness of about 0.1 micron or less.

11. A nondigestible fat composition according to claim 10 which comprises from about 60% to about 99% liquid nondigestible oil and from about 1% to about 40% of the solid polyol polyester particles dispersed in said oil.

12. A nondigestible fat composition according to claim 11 wherein the liquid nondigestible oil is a liquid sucrose fatty acid polyester.

13. A nondigestible fat composition according to claim 12 wherein the nondigestible solid particles comprise material selected from A) diversely esterified polyol polyesters wherein at least 15% of the ester groups therein are formed from $C_{20}$–$C_{26}$ saturated fatty acid radicals;

B) polyol polyester materials comprising from about 1% to 100% of a polyol polyester polymer component wherein at least 15% of the hydroxyl groups of said polyol polyester material are esterified with $C_{20}$–$C_{26}$ saturated fatty acid radicals;

C) polyglycerol esters containing at least 2 glycerol moieties and having at least 30% of the hydroxyl groups of said glycerol moieties esterified with $C_{18}$ or higher fatty acid radicals; and D) cocrystallized blends of:

(i) a nondigestible solid polyol fatty acid polyester hardstock having a complete melting point above about 37° C. and normally tending to form spherulitic particles having a diameter of about 3 microns or larger when crystallized in the liquid sucrose fatty acid polyester; and (ii) a crystal modifier capable of inducing said hardstock to form nondigestible particles having a thickness of 1 micron or less when cocrystallized with hardstock in the liquid sucrose fatty acid polyester; the ratio of said hardstock to said crystal modifier in cocrystallized blend ranging from about 95:5 to about 20:80.

14. A nondigestible fat composition according to claim 13 wherein the nondigestible particles comprise a cocrystallized blend of sucrose fatty acid polyester hardstock and a crystal modifier which is selected from A) diversely esterified polyol polyesters wherein at least 15% of the ester groups therein are formed from $C_{20}$–$C_{26}$ saturated fatty acid radicals;

B) polyol polyester materials comprising from about 1% to 100% of a polyol polyester polymer component wherein at least 15% of the hydroxyl groups of said polyol polyester material are esterified with $C_{20}$–$C_{26}$ saturated fatty acid radicals;

C) polyglycerol esters containing at least 2 glycerol moieties and having at least 30% of the hydroxyl groups of said glycerol moieties esterified with $C_{18}$ or higher fatty acid radicals;

D) naturally occurring waxes and paraffinic hydrocarbon microcrystalline waxes;

E) monoglycerides containing one ester group derived from $C_{18}$ or higher fatty acid radicals; and F) long chain alcohols.

15. A nondigestible fat composition according to claim 14 having a Solid Fat Content profile slope between 70° F. and 98.6° F. of from 0 to about −0.5% solids/°F., an Oil Separation Value of about 12 grams or less, and a Thixotropic Area Value of about 10 kPa/sec or greater.

16. A nondigestible fat composition useful as a replacement for triglyceride fats or oils in foods, which fat composition has a Solid Fat Content profile slope between 70° F. and 98.6° F. of from 0 to about −0.75% solids/°F. and which fat composition comprises:

A. a liquid nondigestible oil having a complete melting point below about 37° C.; and B. nondigestible solid particles dispersed in said oil in an amount sufficient to control passive oil loss upon ingestion of said composition, said particles having a complete melting point above about 37° C. but below about 500° C., with said particles further serving to impart to said composition a Thixotropic Area Value of at least about 10 kPa/second and wherein the liquid nondigestible oil and the nondigestible solid are co-crystallized in a manner such that the nondigestible solid forms dispersed platelet-like particles having a thickness of 1 micron or less in the liquid nondigestible oil said particles furthermore not consisting solely of polyol polyesters wherein the polyol moiety of said polyol polyesters has at least 4 hydroxyl groups, at least 4 of which hydroxyl groups are esterified, and wherein the ester groups in said polyol polyesters are comprised of a combination of:

(i) $C_{12}$ or higher unsaturated fatty acid radicals, $C_2$–$C_{12}$ saturated fatty acid radicals or mixtures thereof, and (ii) $C_{20}$ and higher saturated fatty acid radicals; wherein the molar ratio of the (i) to (ii) radicals in said combination ranges from about 1.15 to about 2:1 and wherein at least 15% by weight of the fatty acid radicals forming said combination are $C_{20}$ and higher saturated fatty acid radicals.

17. A nondigestible fat composition according to claim 16 which comprises from about 60% to about 99% liquid nondigestible oil and from about 1% to about 40% of the nondigestible solid particles dispersed in said oil.

18. A nondigestible fat composition according to claim 17 wherein the liquid nondigestible oil is a liquid sucrose fatty acid polyester.

19. A nondigestible fat composition according to claim 18 wherein the nondigestible solid particles are selected from
    A) diversely esterified polyol polyesters wherein at least 15% of the ester groups therein are formed from $C_{20}$–$C_{26}$ saturated fatty acid radicals;
    B) polyol polyester materials comprising from about 1% to 100% of a polyol polyester polymer component wherein at least 15% of the hydroxyl groups of said polyol polyester material are esterified with $C_{20}$–$C_{26}$ saturated fatty acid radicals;
    C) polyglycerol esters containing at least 2 glycerol moieties and having at least 30% of the hydroxyl groups of said glycerol moieties esterified with $C_{18}$ or higher fatty acid radicals; and
    D) cocrystallized blends of:
        (i) a nondigestible solid polyol fatty acid polyester hardstock having a complete melting point above about 37° C. and normally tending to form spherulitic particles having a diameter of about 3 microns or larger when crystallized in the liquid sucrose fatty acid polyester; and
        (ii) a crystal modifier capable of inducing said hardstock to form nondigestible particles having a thickness of 1 micron or less when cocrystallized with hardstock in the liquid sucrose fatty acid polyester; the ratio of said hardstock to said crystal modifier in cocrystallized blend ranging from about 95:5 to about 20:80.

20. A nondigestible fat composition according to claim 19 wherein the crystal modifier is selected from
    A) diversely esterified polyol polyesters wherein at least 15% of the ester groups therein are formed from $C_{20}$–$C_{26}$ saturated fatty acid radicals;
    B) polyol polyester materials comprising from about 1% to 100% of a polyol polyester polymer component wherein at least 15% of the hydroxyl groups of said polyol polyester material are esterified with $C_{20}$–$C_{26}$ saturated fatty acid radicals;
    C) polyglycerol esters containing at least 2 glycerol moieties and having at least 30% of the hydroxyl groups of said glycerol moieties esterified with $C_{18}$ or higher fatty acid radicals;
    D) naturally occurring waxes and paraffinic hydrocarbon microcrystalline waxes;
    E) monoglycerides containing one ester group derived from $C_{18}$ or higher fatty acid radicals; and
    F) long chain alcohols.

21. A nondigestible fat composition according to claim 20 having a Solid Fat Content profile slope between 70° F. and 98.6° F. of from 0 to about −0.5% solids/°F. and a Thixotropic Area Value of about 25 kPa/sec or greater.

* * * * *